US011368554B2

(12) United States Patent
Long et al.

(10) Patent No.: US 11,368,554 B2
(45) Date of Patent: Jun. 21, 2022

(54) SYSTEMS AND METHODS FOR REGULATING SERVICE BEHAVIOR

(71) Applicant: PayPal, Inc., San Jose, CA (US)

(72) Inventors: Huynh Phi Long, Singapore (SG); Kai Xie, Singapore (SG); Edwin Boaz Soenaryo, Singapore (SG); Chun Kiat Ho, Singapore (SG); Lin Song, Singapore (SG); Karl Anton Hennig, Campbell, CA (US); Thomas Anthony Doran, Palo Alto, CA (US)

(73) Assignee: PAYPAL, INC., San Jose, CA (US)

( * ) Notice: Subject to any disclaimer, the term of this patent is extended or adjusted under 35 U.S.C. 154(b) by 193 days.

(21) Appl. No.: 16/896,588

(22) Filed: Jun. 9, 2020

(65) Prior Publication Data
US 2021/0385297 A1    Dec. 9, 2021

(51) Int. Cl.
*H04L 29/08* (2006.01)
*H04L 67/00* (2022.01)
*G06F 21/57* (2013.01)
*G06F 11/36* (2006.01)

(52) U.S. Cl.
CPC ............ *H04L 67/34* (2013.01); *G06F 11/362* (2013.01); *G06F 11/3664* (2013.01); *G06F 21/572* (2013.01)

(58) Field of Classification Search
CPC .... H04L 67/34; G06F 11/362; G06F 11/3664; G06F 21/572
See application file for complete search history.

(56) References Cited

U.S. PATENT DOCUMENTS

| 8,418,124 | B2 * | 4/2013 | Turner | G06F 21/629 |
| | | | | 717/121 |
| 9,077,758 | B1 * | 7/2015 | McGovern | H04L 63/14 |
| 9,088,571 | B2 * | 7/2015 | Bryan | H04L 63/10 |
| 9,384,358 | B2 * | 7/2016 | Lim | H04L 63/107 |
| 9,813,285 | B1 * | 11/2017 | McGovern | G06F 21/55 |
| 10,805,171 | B1 * | 10/2020 | Anwer | H04L 41/0893 |
| 10,977,149 | B1 * | 4/2021 | Zappella | G06F 11/3457 |

(Continued)

OTHER PUBLICATIONS

Jian KE et al. "An Implementation of Service Composition for Enterprise Business Processes," 2019 IOP Conf. Ser.: Earth Environ. Sci. 234 012091.

*Primary Examiner* — Philip J Chea
*Assistant Examiner* — Wuji Chen
(74) *Attorney, Agent, or Firm* — Haynes and Boone, LLP

(57) ABSTRACT

Systems and methods for regulating service behavior include a system provider device where a policy is registered. The policy defines a modified service behavior for a service running one or more remote servers. In some embodiments, the registered policy is transmitted to a first satellite agent located at a first remote server. By way of example, and after transmitting the registered policy to the first satellite agent, data is received from the first satellite agent corresponding to the service having the modified service behavior running on the first remote server. Thereafter, the system provider may verify that the service having the modified service behavior running on the first remote server satisfies a metric. In various embodiments, and in response to the verifying, the registered policy is transmitted to a second satellite agent located at a second remote server.

20 Claims, 9 Drawing Sheets

(56) References Cited

U.S. PATENT DOCUMENTS

| | | | |
|---|---|---|---|
| 2005/0120106 A1* | 6/2005 | Albertao | H04L 67/306 709/223 |
| 2006/0282876 A1* | 12/2006 | Shelest | G06F 21/6218 726/1 |
| 2013/0227659 A1* | 8/2013 | Raleigh | H04W 28/0215 726/5 |
| 2014/0359261 A1* | 12/2014 | Collins | G06F 8/60 713/1 |
| 2016/0308905 A1* | 10/2016 | Stiekes | H04L 63/166 |
| 2016/0315972 A1* | 10/2016 | Lim | H04L 63/10 |
| 2017/0070504 A1* | 3/2017 | Ramachandran | H04L 63/061 |
| 2017/0141946 A1* | 5/2017 | Balestrazzi | H04L 41/0686 |
| 2019/0045360 A1* | 2/2019 | Greer | H04L 63/08 |
| 2020/0310779 A1* | 10/2020 | Van Heuklon | G06F 8/65 |
| 2020/0412665 A1* | 12/2020 | Shankar | H04L 63/20 |
| 2021/0373953 A1* | 12/2021 | Polackal | H04L 67/288 |
| 2022/0014512 A1* | 1/2022 | Raleigh | H04L 67/322 |

\* cited by examiner

SYSTEMS AND METHODS FOR REGULATING SERVICE BEHAVIOR

BACKGROUND

Field of the Invention

The present disclosure generally relates to computing environments and platforms, and more particularly to modifying service behavior on-the-fly across different types computing environments and platforms.

Related Art

More and more individuals rely on electronic networks, such as the Internet, for a variety of services including purchasing products (e.g., from merchants and/or individuals), exchanging electronic mail, conducting audio and/or video conferencing, participating in online chats, browsing the World Wide Web, playing games, conducting electronic banking, and storing and accessing electronic files, among others.

In various cases, such services are implemented across a variety of environments or platforms (e.g., including various technology stacks), which are routinely upgraded, deprecated, or replaced, and service application owners/developers may struggle to keep their services up-to-date with these changes while also maintaining a clean, focused, and error-free service codebase. Moreover, modifications to the service codebase can be tedious and prone to error, especially with services which have dependencies across different domains, and can introduce logic which is irrelevant to the main functionality of the service. As a result, the various costs (e.g., such as financial, time, errors, etc.) that come along with service codebase modifications prevent services from fully utilizing the unique capabilities and advantages of the various environments and/or platforms on which the services are being run.

Thus, there is a need for a system for regulating service behavior on-the-fly across different types environments or platforms.

Figure 1:
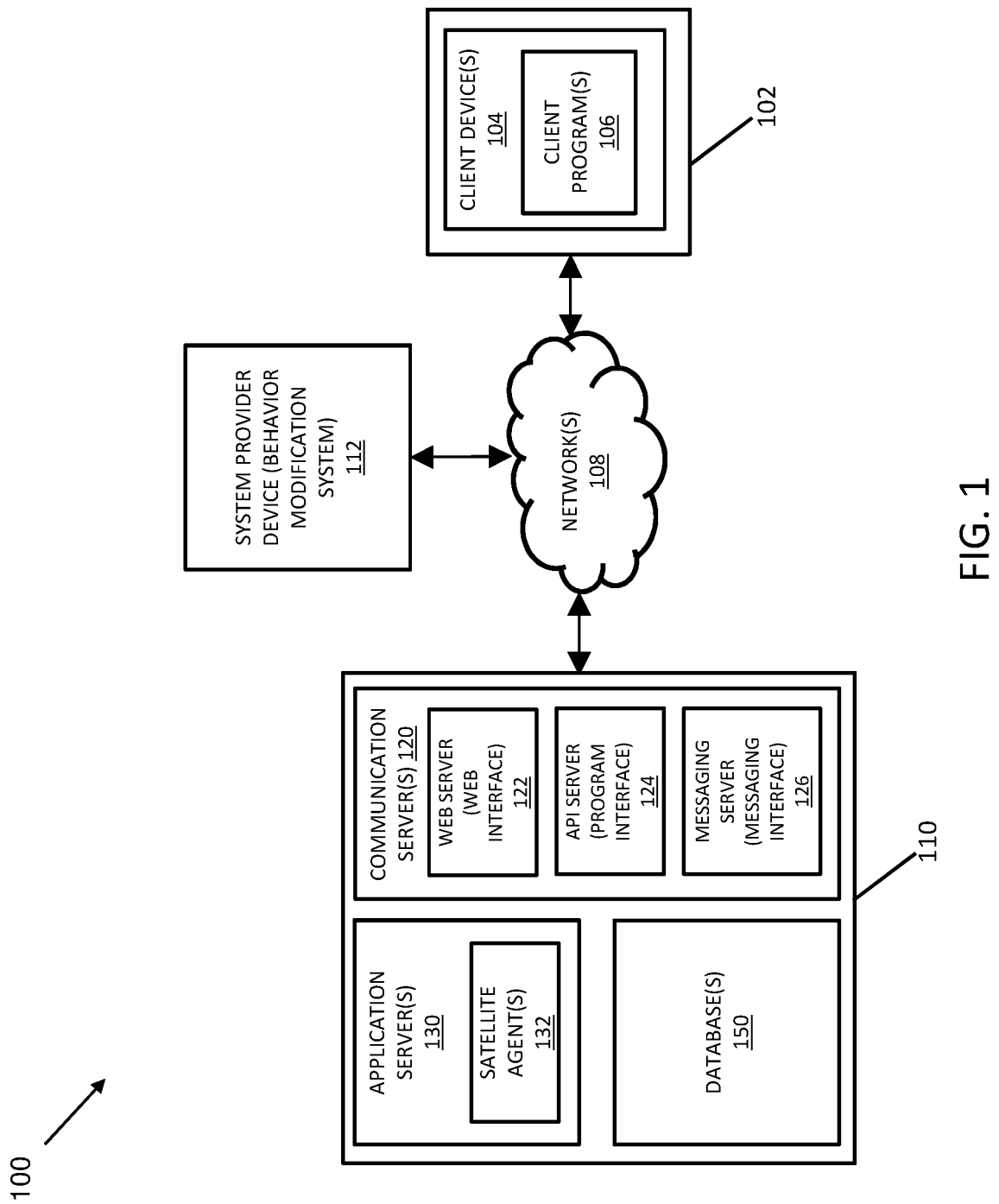
FIG. 1 is a schematic view illustrating a system for regulating service behavior according to one embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting.

In various aspects, the present disclosure provides systems and methods for regulating service behavior on-the-fly across different types environments or platforms. In particular, the systems and methods disclosed herein provide for real time (e.g., during application runtime) and non-intrusive (e.g., without modification of a codebase) modification of a behavior of a service that is running on any type of application server including any type of technology framework or stack. Generally, behavior modification is governed by policies, which may be applicable to a single service or a group of services. In some embodiments, the disclosed system includes a central hub (e.g., a service provider) that governs policy registration and construction, as well as satellite monitoring and enforcement agents (referred to herein as "satellite agents"), which are located at the various application servers and which enforce the policies for services running on their respective application servers. In at least some embodiments, a behavior modification policy may initially be tested using a simulation application server prior to transmitting the behavior modification policy to a production application server. Various other embodiments and advantages of the present disclosure will become evident in the discussion that follows and with reference to the accompanying figures.

Among other uses, individuals increasingly rely on electronic networks, such as the Internet, for a variety of services including purchasing products (e.g., from merchants and/or individuals), exchanging electronic mail, conducting audio and/or video conferencing, participating in online chats, browsing the World Wide Web, playing games, conducting electronic banking, and storing and accessing electronic files, among others.

These services may be implemented across a variety of environments or platforms (e.g., including various technology stacks), which are routinely upgraded, deprecated, or replaced, and service application owners/developers may struggle to keep their services up-to-date with these changes while also maintaining a clean, focused, and error-free service codebase. Moreover, modifications to the service codebase can be tedious and prone to error, especially with services which have dependencies across different domains, and can introduce logic which is irrelevant to the main functionality of the service. As a result, the various costs (e.g., such as financial, time, errors, etc.) that come along with service codebase modifications prevent services from fully utilizing the unique capabilities and advantages of the various environments and/or platforms on which the services are being run.

While there are currently some methods for modifying service behaviors, existing solutions remain inadequate. As one example, Java agents may be used to examine and modify the behavior of Java classes. By using the Java Instrumentation application programming interface (API), Java agents can be used to intercept applications running on a Java Virtual Machine (JVM), modifying their bytecode. However, Java agents are not suited for service/system level modifications (classes, methods) and require a case-by-case setup. Stated another way, Java agents are used for Java-based application servers and are thus not suited for use in other non-Java-based application or web servers. In another example, Docker provides a set of platform as a service (PaaS) products that use OS-level virtualization to deliver software in packages called containers. Containers are isolated from one another and bundle their own software, libraries and configuration files, and they may communicate with each other through well-defined channels. Docker containers enable the seamless build, deployment, and communication of services. However, as a service container, the capability to modify service behavior is extremely limited as this would be contrary to Docker's main purpose. In still another example, a service mesh provides a way to control how different services communicate with each other. By design, a service mesh does not interfere with a service's internal processing logic and libraries. Thus, currently existing solutions, frameworks, or plugins, while perhaps effective within their respective focused domains and stacks, do not provide a backbone for a full-scale service behavior regulating system across any of a plurality of technology stacks or environments. Stated another way, for different technology platforms and environments, there may exist different ways of modifying service behaviors; however, such techniques are specific to the particular technology platform or environment in which they are implemented.

By providing a system for regulating service behavior as described herein, service behaviors may be modified on-the-fly across substantially any type of environment or platform. In particular, and as noted above, the disclosed embodiments provide for real time and non-intrusive modification of a behavior of a service that is running on any type of application server (or web server) including any type of technology framework or stack. As a result, the systems and methods disclosed herein provide a full-scale, comprehensive service behavior regulating system that works across any type of technology stack or environment. For example, and in contrast to existing implementations, a centralized policy management system may be used to maintain policies for, and distribute policies to, different application servers operating on different technology platforms or environments. In some embodiments, at least some existing technologies (e.g., such as Java agents, Docker, service mesh, shell scripts, or others) may be combined, and/or employed as needed, as part of the full-scale, comprehensive service behavior regulating system that may be used for modifying service behavior across any of a plurality of technology stacks or environments. Additional embodiments and advantages will become evident in the discussion that follows and with reference to the accompanying figures.

For purposes of this discussion, "real time" may be defined as any process which has an immediate request, processing, and response workflow. For example, as soon as a policy for behavior modification of a service is registered and transmitted to a satellite agent (located at a remote application server), the satellite agent may enforce the policy and thereby immediately (e.g., within a few seconds) change the behavior of the service running on the remote application server in accordance with the registered policy. More generally, real time may be simply defined as a service behavior modification process that is performed (e.g., as a patching process) without the usual lengthy and formal rollout or deployment process. In some embodiments, real time may also be defined as a process (e.g., such as a behavior modification process) that occurs while an application or service is running (e.g., during runtime).

As used herein, "non-intrusive" modification of a service behavior may be defined as a service behavior modification that is performed without modification of a codebase associated with the service having the behavior that is being modified (e.g., such as a service codebase or an application codebase). A codebase, as used herein, may include a collection of source code used to build a particular software system, application, service, or software component. In various embodiments, the codebase associated with a particular service may be stored in memory accessible to the application server or the service provider, or may be stored in a repository such as GitHub, Bitbucket, GitLab, etc.

As noted above, behavior modification according to the disclosed embodiments may be governed by policies. In various embodiments, a policy may be constructed using a combination of foundational mechanisms (e.g., such as rules or algorithms) and complementary means (e.g., such as artificial intelligence (AI) and machine learning (ML) models). In some cases, and instead of using a combination of both, a policy may be defined by either the foundational mechanisms (rules, algorithms) or the complementary means (AI and ML models). Policies, regardless of how they are constructed, may be used to govern behavior of a single service or a group of services running on various application servers. Stated another way, the policies define how particular classes, functions, or variables should behave in different use cases and within different environments or platforms.

In accordance with some embodiments, the services governed by the policies may include any of a number of services, each of which is responsible for providing a particular functionality. Some examples of services include a risk service, a user service, a refund service, an admin service, a transaction service, a compliance service, a payment service, an instruments service, an invoicing service, a credit service, a disputes service, or any of a plurality of other services useful for providing various business functionality. In some examples, the services may be provided by a payment service provider such as, for example, PayPal™, Inc. of San Jose, Calif. The services may, in various cases, be deployed on a physical application server (physical host) or on an application server running on a cloud host (virtual host). In various embodiments, any number of instances for each service may be deployed on an application server. For example, the number of instances for a particular service may increase or decrease depending on a demand for the particular service.

In some embodiments, the services disclosed herein may include microservices that are deployed within a microservice architecture. Generally, a microservices architecture consists of a collection of small, independent, highly cohesive (e.g., meaning closely related functionality stays together within the same service), and loosely coupled (e.g., meaning minimal dependence on other services) services. Each service is self-contained and should implement a single business capability. In some embodiments, each service includes its own codebase, and each service may also have its own database. Services can be deployed independently and can be updated without having to redeploy an entire application. Services may communicate with each other using APIs, and services do not need to share the same technology stack, libraries, or frameworks. In addition to the services themselves, a microservices architecture may include a management/orchestration component and an API gateway. The management/orchestration component is responsible for placing services on nodes, identifying failures, rebalancing services across nodes, as well as other functionality. In some embodiments, the API gateway provides an entry point for clients, so that instead of calling services directly, clients call the API gateway, which forwards the call to the appropriate services on the back end. While some examples of services and features of a microservice architecture have been provided, these examples are not meant to be limiting, and those skilled in the art in possession of the present disclosure will recognize other services and features that may be used, while remaining within the scope of the present disclosure.

The systems and methods disclosed herein may be applicable to a number of different use cases. As one example, some embodiments may provide for on-boarding/integration of services across various environments or platforms, in order to leverage the unique capabilities and advantages of the different environments or platforms, with minimal effort and without meaningless codebase modification. In another example, some embodiments provide for large-scale environment/platform migration, where applications and services are migrated from one environment/platform to another environment/platform. In some cases, such a migration process may be carried out in parallel with modifications to the service codebase, if needed or so desired. Embodiments of the present disclosure may further be used for performance optimization, for example, to address common bad coding practices that negatively affect service performance. For instance, automatic service behavior modification may be provided by distribution of a performance optimization patch on a large-scale and across different environments or platforms. In still other examples, some embodiments provide the ability to patch security breaches for all live services upon deployment, and a tremendous amount of loss can be avoided. In at least some conventional implementations, security breaches may be addressed with static code analysis, the updating of vulnerable libraries, and the tedious process of code modification and testing, all of which hinders an organizations agility.

Of particular note, various embodiments disclosed herein provide a simulation platform, for example, where a behavior modification policy may be tested using a simulation application server prior to transmitting the behavior modification policy to a production application server. In some embodiments, the simulation process carried out by the simulation application server provides for simulating a service behavior modification using historical data. For example, historical data may be fed into a client's service to simulate its output and/or behavior during a particular historical time period, where such simulated output and/or behavior can then be compared to the actual historical data (e.g., for accuracy/parity). Since most existing implementations of services are programmed to process real-time, in-the-moment data (not historical data), such existing implementations would require modification of fundamental logic within the client's codebase in order to process historical data (e.g., by changing its mechanism of consuming and producing data). Such a process would take a long time and may not be comprehensive, which may introduce bugs into the codebase, and which is costly for both service and platform teams. In contrast, and in accordance with various embodiments, if the simulation process (including any necessary code changes) can be carried out automatically, then less effort would be required by the service and platform teams upon on-boarding (e.g., of a service). In addition, a client's extended requirements can be carried out faster, more efficiently, and with less interference to existing processes. While some examples of various use cases of the disclosed embodiments have been provided, these examples are not meant to be limiting, and those skilled in the art in possession of the present disclosure will recognize other use cases, while remaining within the scope of the present disclosure.

Referring now to FIG. 1, illustrated therein is an exemplary embodiment of a system 100 adapted for implementing one or more embodiments disclosed herein for regulating service behavior on-the-fly across substantially any type of environment or platform. As shown, the system 100 may include a plurality of servers and/or software components that operate to perform various methodologies in accordance with the described embodiments. Example servers may include stand-alone and enterprise-class servers operating a server operating system (OS) such as a MICROSOFT® OS, a UNIX® OS, a LINUX® OS, or other suitable server-based OS. It may be appreciated that the servers illustrated in FIG. 1 may be deployed in other ways and that the operations performed and/or the services provided by such servers may be combined, distributed, and/or separated for a given implementation and may be performed by a greater number or a fewer number of servers. One or more servers may be operated and/or maintained by the same or different entities.

In some embodiments, the system 100 may include, among various devices, servers, databases and other elements, one or more clients 102 that may include one or more client devices 104, such as a laptop, a desktop, a mobile computing device, a tablet, a PC, a wearable device, and/or any other computing device having computing and/or communications capabilities in accordance with the described embodiments. Client devices 104 may include a cellular telephone, smart phone, electronic wearable device (e.g., smart watch, virtual reality headset), or other similar mobile devices that a user may carry on or about his or her person and access readily.

Client devices 104 generally may provide one or more client programs 106, such as system programs and application programs to perform various computing and/or communications operations. Example system programs may include, without limitation, an operating system (e.g., MICROSOFT® OS, UNIX® OS, LINUX® OS, macOS®, iPadOS™, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Example application programs may include, without limitation, a web browser application, messaging application, contacts application, calendar application, electronic document application, database application, media application (e.g., music, video, television), location-based services (LBS) application (e.g., GPS, mapping, directions, positioning systems, geo-location, point-of-interest, locator) that may utilize hardware components such as an antenna, and so forth. One or more of client programs 106 may display various graphical user interfaces (GUIs) to present information to and/or receive information inputted by one or more users of client devices 104.

As shown, client devices 104 are coupled to one or more networks 108, the one or more networks 108 further coupled to an application infrastructure 110 and a system provider device 112. The system provider device 112 may include a behavior modification system configured to implement one or more of the functionalities of the various embodiments of the present disclosure, as described in more detail below. Similarly, the application infrastructure 110 may be configured to implement one or more of the functionalities of the embodiments of the present disclosure, as described below. Further, the application infrastructure 110 may be structured, arranged, and/or configured to allow client 102 to establish one or more communications sessions between the application infrastructure 110 and various client devices 104 and/or client programs 106. Accordingly, a communications session between client devices 104 and the application infrastructure 110 may involve the unidirectional and/or bidirectional exchange of information and may occur over one or more types of networks 108 depending on the mode of communication. While the embodiment of FIG. 1 illustrates the system 100 deployed in a client-server operating environment, it is to be understood that other suitable operating environments and/or architectures may be used in accordance with the described embodiments. For instance, the system 100 may be deployed as part of a microservices architecture, in accordance with some embodiments.

In some embodiments, the application infrastructure 110 may include one or more communications servers 120 to provide suitable interfaces that enable communication using various modes of communication and/or via the one or more networks 108. Communications servers 120 may include a web server 122, an API server 124, and/or a messaging server 126 to provide interfaces to one or more application servers 130. In some embodiments, the API server 124 may include an API gateway for a microservices architecture, as discussed above. Application servers 130 of the application infrastructure 110 may be structured, arranged, and/or configured to provide various services to client devices that communicate with the application infrastructure 110. In various embodiments, the client devices 104 may communicate with the application servers 130 of the application infrastructure 110 via one or more of a web interface provided by the web server 122, a programmatic interface provided by the API server 124, and/or a messaging interface provided by the messaging server 126. It may be appreciated that the web server 122, the API server 124, and the messaging server 126 may be structured, arranged, and/or configured to communicate with various types of client devices 104, and/or client programs 106, and may interoperate with each other in some implementations.

Web server 122 may be arranged to communicate with web clients and/or applications such as a web browser, web browser toolbar, desktop widget, mobile widget, web-based application, web-based interpreter, virtual machine, mobile applications, and so forth. API server 124 may be arranged to communicate with various client programs 106 comprising an implementation of API for the application infrastructure 110. Messaging server 126 may be arranged to communicate with various messaging clients and/or applications such as e-mail, instant message (IM), short message service (SMS), multimedia messaging service (MMS), telephone, Voice over Internet Protocol (VoIP), video messaging, Internet Relay Chat (IRC), and so forth, and the messaging server 126 may provide a messaging interface to enable access by client 102 to the various services and functions provided by the application servers 130.

Application servers 130 of the application infrastructure 110 may include one or more servers that provide various services to client devices and/or entities controlling the application infrastructure 110. Application servers 130 may include multiple servers and/or components. In some embodiments, the application servers 130 may include a simulation server, a quality assurance (QA) server, a production server, or other type of server. In some cases, the application servers 130 may further include satellite agents 132 that are configured to enforce policies for services running on the application servers 130. In various examples, the application servers 130 and the satellite agents 132 may be structured and arranged to implement one or more of the functionalities of the embodiments of the present disclosure, as described below.

Application servers 130, in turn, may be coupled to and capable of accessing databases 150. Databases 150 generally may store and maintain various types of information for use by application servers 130 and may comprise or be implemented by various types of computer storage devices (e.g., servers, memory) and/or database structures (e.g., relational, object-oriented, hierarchical, dimensional, network) in accordance with the described embodiments. For example, databases 150 may store data corresponding to a service running on one or more of the application servers 130, where the data may include simulation data, production data, historical data, or other types of data corresponding to the service.

The network 108 may be implemented as a single network or a combination of multiple networks. For example, in various embodiments, the network 108 may include the Internet and/or one or more intranets, landline networks, wireless networks, cellular networks, satellite networks, and/or other appropriate types of networks. In some examples, the client 102 may communicate through the network 108 via cellular communication, by way of one or more user network communication devices. In other examples, the client 102 may communicate through the network 108 via wireless communication (e.g., via a WiFi network), by way of one or more user network communication devices. In yet other examples, the client 102 may communicate through the network 108 via any of a plurality of other radio and/or telecommunications protocols, by way of one or more user network communication devices. In still other embodiments, the client 102 may communicate through the network 108 using a Short Message Service (SMS)-based text message, by way of one or more user network communication devices.

The system provider device 112, which includes a behavior modification system, may likewise couple to the network 108 via a wired or wireless connection. As described in more detail below, the system provider device 112 may include a policy registry, a policy training hub, and a system provider database, among other components. Software or instructions stored on a computer-readable medium, and executed by one or more processors of the system provider device 112, allows the system provider device 112 to send and receive information over the network 108. Furthermore, the system provider device 112 may be configured to implement the various embodiments of the system for regulating service behavior as described herein.

In some examples, the system provider device 112 is configured to provide for modification of service behavior on-the-fly and across various application servers implemented using any of a plurality of environments, platforms, technology stacks, or other components. In various embodiments, the system provider device 112 provides for real time and non-intrusive service behavior modification, as described in more detail herein. The system provider device 112 may also provide for centralized policy management in order to maintain policies for, and distribute policies to, different application servers operating on different technology platforms or environments. In various embodiments, the system provider device 112 includes a policy registry, a policy training hub, and a system provider database, among other components, to implement one or more of the features described herein. In addition, in some embodiments, a system provider (e.g., operating the system provider device 112) may include a payment service provider such as, for example, PayPal™ Inc. of San Jose, Calif.

Figure 2:
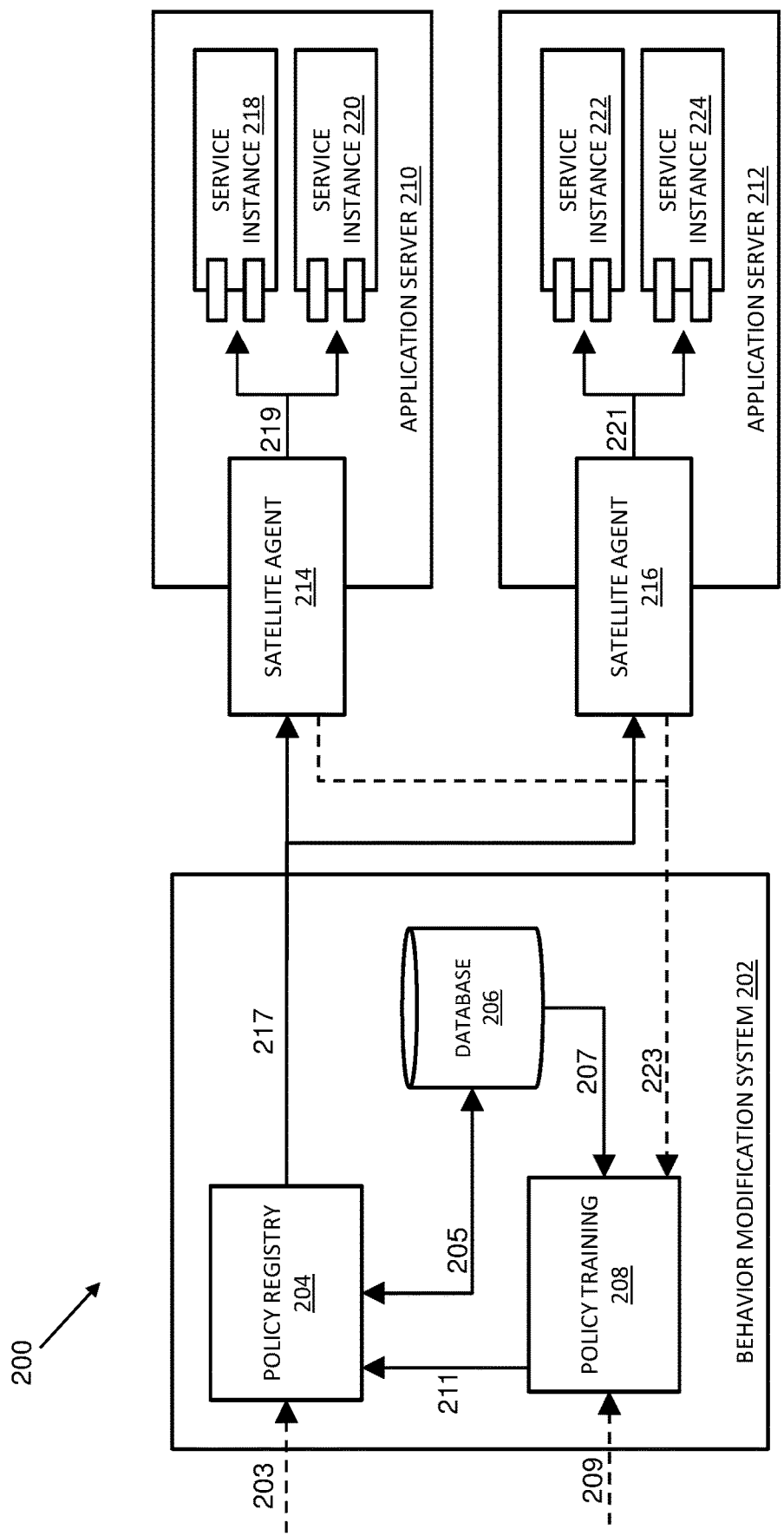
FIG. 2 is a schematic view illustrating a more detailed view of various aspects of the system for regulating service behavior, as shown in FIG. 1 according to one embodiment.

For a better understanding of the various embodiments disclosed herein, reference is now made to FIG. 2, which shows an exemplary embodiment of a system 200 for regulating service behavior. In particular, the system 200 provides more detailed views of portions of the system of FIG. 1 that are configured to implement one or more of the functionalities of the various embodiments of the present disclosure. For example, the system 200 includes a behavior modification system 202, which may be the system provider device 112, discussed above. The system 200 further includes application servers 210 and 212, which may be the application servers 130, discussed above. In various embodiments, the application servers 210, 212 may be implemented using the same or different environments, platforms, technology stacks, or other components. In some examples, the application servers 210, 212 may be implemented using technology stacks that have at least one of a different operating system, a different web server, a different database, a different programming language, or a different web development framework. The system 200 also includes satellite agents 214 and 216, which may be the satellite agents 132, discussed above.

As shown, and in some embodiments, the behavior modification system 202 includes a policy registry 204, a policy training hub 208, and a database 206. By way of illustration, the policy registry 204 is configured to allow for service application owners/developers to register a policy, for example, to implement a desired behavior modification for a service running on one or both of the application servers 210, 212, as indicated by arrow 203. In some embodiments, the service application owners/developers may register a particular policy based on a known security vulnerability or other known issue. As previously noted, policies may be constructed using one or both of foundational mechanisms (e.g., such as rules or algorithms) and complementary means (e.g., such as AI and ML models), and policies may be used to govern behavior of a single service or a group of services running on various application servers such as the application servers 210, 212. After registering a policy with the policy registry 204, the registered policy may be stored in the database 206, as indicated by arrow 205. In some cases, the policy registry 204 may also be configured to retrieve policies stored in the database 206, as indicated by the arrow 205, for example in order to transmit the retrieved policy to one or both of the satellite agents 214, 216. In at least some cases, a policy registered with the policy registry 204 may be transmitted to one or both of the satellite agents 214, 216 prior to, or concurrently with, saving the policy to the database 206.

In various embodiments, the policy training hub 208 may be configured to construct and/or update policies (e.g., using AI and ML models) for service instances having their behavior governed by AI/ML-based policies. In the example of updating policies, the policy training hub 208 may retrieve a previously stored policy on which to perform the update, as indicated by arrow 207. Whether constructing a new policy or updating a previously stored policy, the policy training hub 208 may be further configured to transmit the policy to the policy registry 204, as indicated by arrow 211. In some embodiments, a service application owner/developer, or other external source, may provide a certain algorithm, model, or other information or criteria to the policy training hub 208 for the construction and/or updating of policies, as indicated by arrow 209. As merely one example, consider a case where various security reports from any of a number of sources are provided to the policy training hub 208. In some embodiments, and using AI/ML, the policy training hub 208 may parse the security reports to identify security threats to services running on the application servers 210, 212 and generate and/or update a policy to modify a service behavior and thereby patch the affected services.

As another example, consider a case where many Java applications are running and using a first version of a library. Further consider that at some point in time it is determined that one or more of the Java applications has changed to now use a second version of the library, for example, as a result of applying a particular security patch. In some cases, the behavior modification system 202 (e.g., the policy training hub 208) can automatically learn about this change and automatically apply the same security patch to the remaining Java applications that have not yet applied the security patch (e.g., depending on a confidence level of the behavior modification system 202). Alternatively, in some embodiments, the behavior modification system 202 may be used to inform an application or service owner/developer that a security patch has been detected as being applied to one or more other applications or services, and the behavior modification system 202 may confirm with the application or service owner/developer whether or not the behavior modification system 202 should apply the same security patch to their service and/or application.

In still another example, consider a risk service running on an application server, where the application server is in communication with the behavior modification system 202, as described below. In some embodiments, for example, the risk service may include a risk model within the risk service instance, where the risk model continuously calculates a risk of a transaction (e.g., of a payment transaction). In various embodiments, the risk of transaction may dynamically change based on any of a variety of risk factors such as a last pinged IP address for a user device, other user device information, country information, or other risk factors. In some cases, and as a result of the dynamically changing risk factors, if the risk model determines that a risk level has increased above, or decreased below, given threshold levels, then the risk service may provide feedback to the training hub 208 to dynamically update a particular policy (e.g., such as a risk service policy).

In the example of FIG. 2, the application server 210 includes a service instance 218 and a service instance 220, and the application server 212 includes a service instance 222 and a service instance 224. As previously noted, any number of instances for each service may be deployed on an application server. For example, the number of instances for a particular service may increase or decrease depending on a demand for the particular service. The services provided by the service instances 218, 220, 222, 224 may include any of a variety of services such as a risk service, a user service, a refund service, an admin service, a transaction service, a compliance service, a payment service, an instruments service, an invoicing service, a credit service, a disputes service, or any of a plurality of other services useful for providing various business functionality.

In various embodiments, communication between the behavior modification system 202 and the application server 210 proceeds through the satellite agent 214. In the same manner, communication between the behavior modification system 202 and the application server 212 proceeds through the satellite agent 216. For instance, in some embodiments, the policy registry 204 may transmit a registered policy to one or both of the satellite agents 214, 216, as indicated by arrow 217. Alternatively, in some embodiments, the satellite agents 214, 216 may continuously retrieve new and/or updated policies from the policy registry 204. In either case, after the satellite agents 214, 216 receive the new and/or updated policies, the satellite agents 214, 216 may enforce the policy on service instances running on their respective application servers. For example, a policy received by the satellite agent 214 may apply the policy to one or both of the service instances 218, 220 running on the application server 210, as indicated by arrow 219. In a similar manner, a policy received by the satellite agent 216 may apply the policy to one or both of the service instances 222, 224 running on the application server 212, as indicated by arrow 221. In addition, for service instances that have their behavior governed by AI/ML-based policies, the satellite agents 214, 216 may provide feedback from the service instances to the policy training hub 208, as indicated by arrow 223. In some embodiments, the feedback from the service instances may include data and statistics. More generally, the feedback from the service instances may include log files which are generated by each service instance and which may contain error information, warning information, debug messages, and/or other information related to the service instances running on their respective application servers. In some embodiments, the policy training hub 208 may then use the feedback from the service instances to train the AI/ML models and update the policies accordingly.

Figure 3:
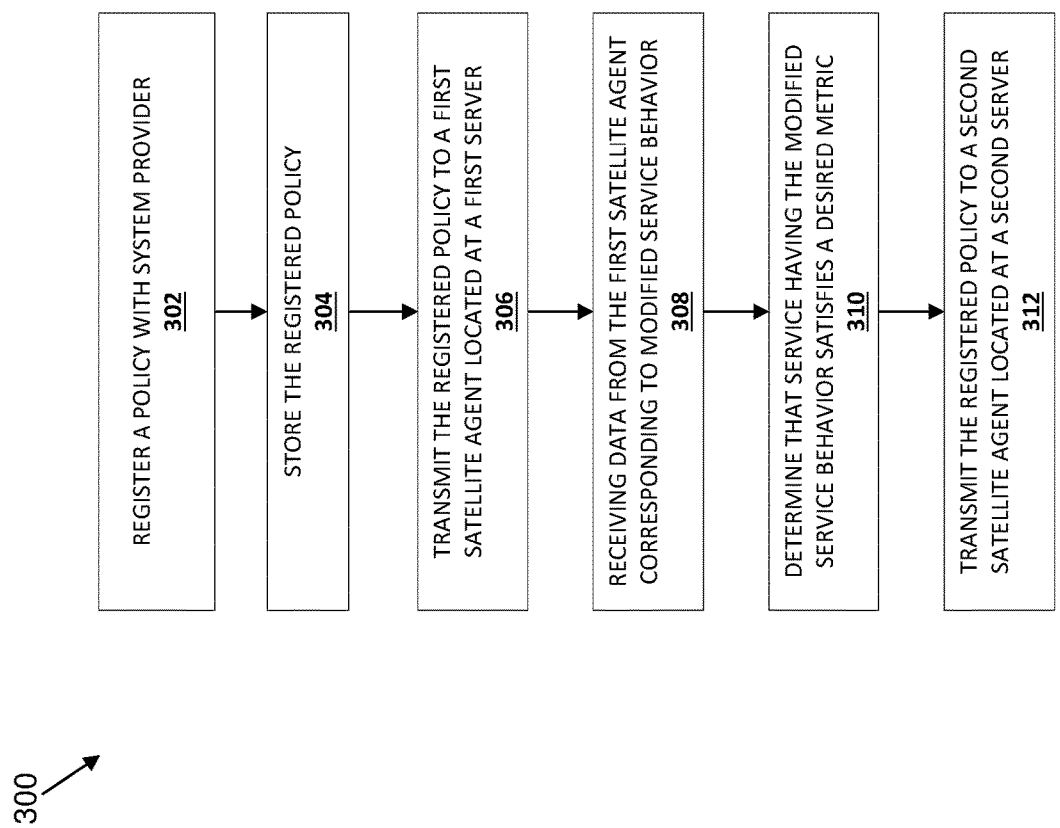
FIG. 3 is a flow chart illustrating an embodiment of a method for implementing a policy modification.

In view of the above discussion regarding the system 200 for regulating service behavior, some exemplary methods for employing the system 200 are provided below. For example, FIG. 3 illustrates an embodiment of a method 300 for implementing a policy modification. It will be understood that additional steps may be performed before, during, and/or after the steps described below with reference to the method 300. In addition, while the steps of the method 300 are shown as occurring serially (e.g., one after another), two or more of the steps of the method 300 may occur in parallel. Further, the steps of the method 300 need not be performed in the order shown and/or one or more of the steps of the method 300 need not be performed. For purposes of illustration, the method 300 is shown and described with reference to FIG. 4, which includes an exemplary view of a system 400 for regulating service behavior. The system 400 includes various features that are substantially the same as features described above with reference to FIG. 2. Thus, one or more aspects discussed above with reference to the system 200 may also apply to the system 400. Additionally, at least some of the operations described with reference to the method 300 may be performed by a system provider (e.g., operating a system provider device).

Figure 4:
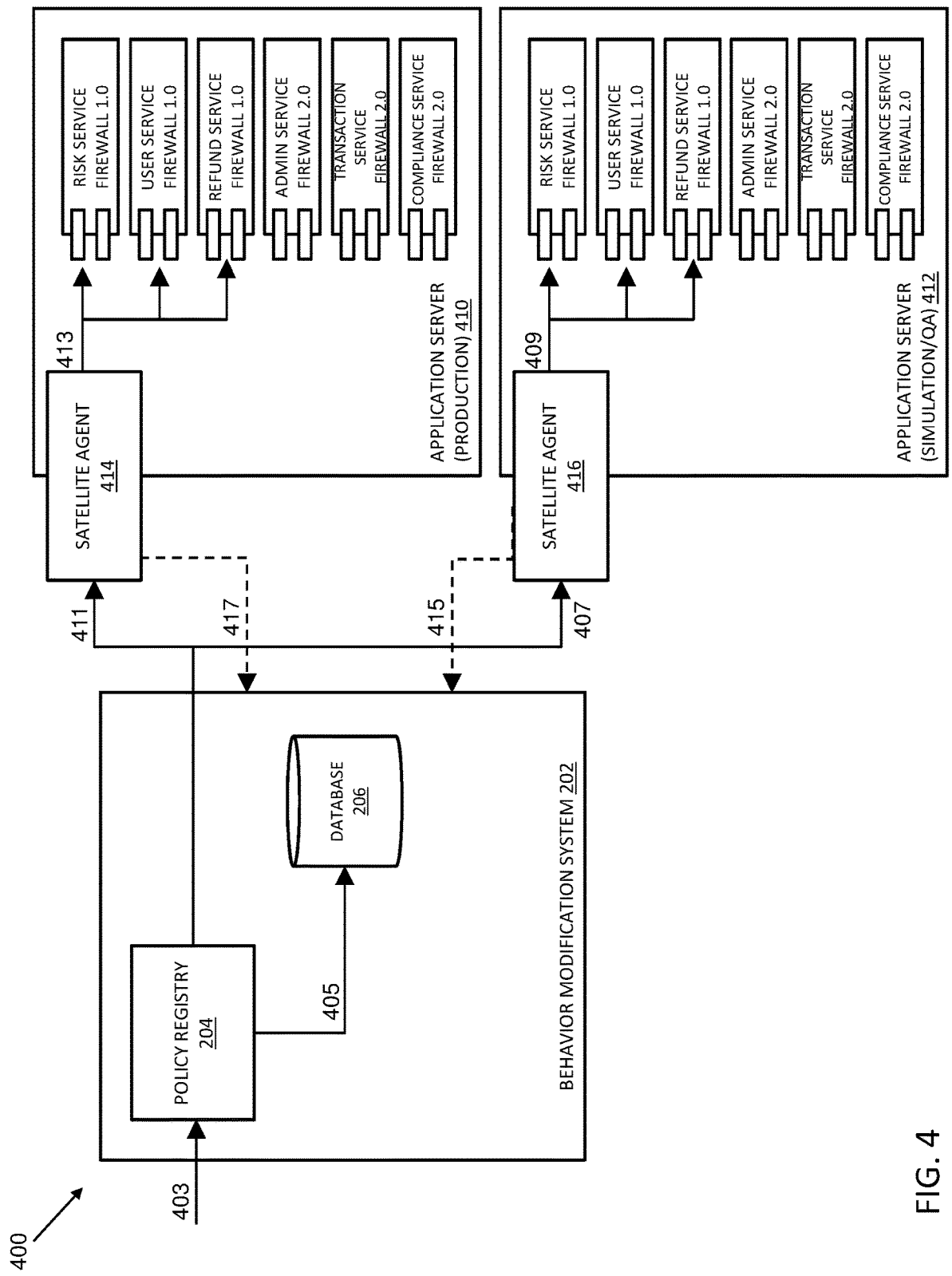
FIG. 4 is a schematic view illustrating an alternative embodiment of the system for regulating service behavior, as shown in FIG. 2.

The method 300 begins at block 302 where a policy is registered with a system provider. As noted above, the system provider may operate a system provider device 112, which includes a behavior modification system (e.g., such as the behavior modification system 202). With reference to FIG. 4, and in an embodiment of block 302, a policy is registered with the policy registry 204 of the behavior modification system 202, as indicated by arrow 403. The policy registered at block 302 may be configured to implement a desired behavior modification for a service instance running on an application server. For purposes of the example of FIG. 4, consider that the policy registered with the policy registry 204 has been constructed using a set of rules, where the set of rules defines a category, a package, which services are to be governed, a modification instruction, and a rollout instruction. As merely one example, the category may include a security patch, the package may include a firewall, the services to be governed may include all services running on a remote application server, the modification instruction may include replacing a vulnerable firewall (e.g., version 1.0) with an enhanced firewall (e.g., version 2.0), and the rollout instruction may specify that the policy for behavior modification is to be sent first to a QA application server (e.g., for testing) prior to sending the policy to a production application server. While some examples of rules used to construct the policy for behavior modification have been provided, these examples are not meant to be limiting, and those skilled in the art in possession of the present disclosure will recognize other rules that may be used to construct the policy, while remaining within the scope of the present disclosure. For example, in some embodiments, the set of rules may define other categories, other packages, other services to be governed, other modification instructions, or other rollout instructions. After registering the policy with the policy registry 204, the method 300 proceeds to block 304 where the registered policy is stored. For example, with reference to FIG. 4, and in an embodiment of block 304, the policy registered with the policy registry 204 is stored in the database 206, as indicated by arrow 405.

The method 300 then proceeds to block 306 where the registered policy is transmitted to a first satellite agent located at a first server. For example, with reference to FIG. 4, and in an embodiment of block 306, the registered policy is transmitted to a satellite agent 416 located at an application server 412, as indicated by arrow 407. In some embodiments, the satellite agent 416 and the application server 412 may be embodiments of the satellite agent 216 and the application server 212, discussed above. In some embodiments, the application server 412 includes a QA server or a simulation server. As shown, the application server 412 includes a plurality of service instances corresponding to a risk service, a user service, a refund service, an admin service, a transaction service, and a compliance service. In the present example, the risk service, the user service, and the refund service include the vulnerable firewall (e.g., version 1.0), and the admin service, the transaction service, and the compliance service include the enhanced firewall (e.g., version 2.0).

After the satellite agent 416 receives the registered policy, and in further embodiment of block 306, the satellite agent 416 may enforce the policy on the plurality of service instances running on the application server 412. As noted above, and in the present example, the modification instruction defined by the registered policy may include replacing a vulnerable firewall (e.g., version 1.0) with an enhanced firewall (e.g., version 2.0). Further, in various embodiments, the satellite agent 416 may monitor the service instances and determine which of the plurality of service instances include the vulnerable firewall (e.g., version 1.0) and which include the enhanced firewall (e.g., version 2.0). As a result, the policy received by the satellite agent 416 may apply the policy (the modification instruction) to the services instances having the vulnerability (the risk service, the user service, and the refund service), as indicated by arrows 409, thereby updating their respective firewalls to the enhanced firewall (e.g., version 2.0). In some embodiments, the risk service, the user service, and the refund service may need to be restarted after the satellite agent applies the modification instruction, for example, to complete the updates to their respective firewalls.

The method 300 then proceeds to block 308 where data is received from the first satellite agent corresponding to a modified service behavior. For example, with reference to FIG. 4, and in an embodiment of block 308, data is received by the behavior modification system 202 from the satellite agent 416, as indicated by arrow 415. In some embodiments, the data received includes log files generated by each of the service instances running on the application server 412. The log files may contain error information, warning information, debug messages, and/or other information related to the service instances running on the application server 412. Further, and in some embodiments, the data received includes information corresponding to the service instances having the modified service behavior (e.g., the updated firewall, in the present example) running on the application server 412.

The method 300 then proceeds to block 310 where the service having the modified service behavior is determined to satisfy a desired metric. For example, the data received by the behavior modification system 202 from the satellite agent 416 (block 308), and which corresponds to the service instances having the modified service behavior, may be analyzed to determine/verify whether a particular metric is satisfied. The particular metric may include, for example, accuracy of the data, parity of the data with historical data, accuracy of model scores, or generally an expected or anticipated result based on the applied modification to the service instances. As one example, consider a regression testing process where underlying infrastructure changes are made to implement bug fixes, software enhancements, configuration changes, etc., and it needs to be determined that application(s) executing on the updated infrastructure do not change the functionality of the application(s). In accordance with some embodiments, the infrastructure changes may be made (e.g., by enforcing behavior policy modifications), and then the same application(s) may be run, with the updated infrastructure, through a simulation environment to determine (e.g., by way of one or more metrics such as accuracy, parity, model scores, etc.) whether the application running on the updated infrastructure produces the same results that were produced by the application(s) prior to the infrastructure changes.

In furtherance of the above discussion, consider the case where the application server 412 includes a simulation server, while application server 410 includes a production server. Generally, and in various embodiments, the simulation server may be used to simulate a service behavior modification prior to applying the service behavior modification to a production server. Stated another way, the simulation server may be used to simulate applying a particular policy to a service instance prior to applying the policy to a service instance on the production server. As a result, a behavior modification policy can be tested in a safe environment (simulation environment) and avoid potential damage that could be caused if the behavior modification policy were applied straightaway to a live, production environment.

By way of example, and as part of the simulation process, a set of historical data may be stored within a behavior modification database, an application server database, and/or a big data storage and processing framework, such as Apache HBase™ or other big data processing framework. The set of historical data may include a breadth of data (e.g., inputs, outputs, as well an any of a plurality of other related data) spanning a particular prior time period (e.g., a prior day, week, month, etc.) and corresponding to one or more service instances running on a production server (e.g., such as the application server 410) prior to application of a behavior modification policy that is to first be simulated on a simulation server (e.g., such as the application server 412). In some embodiments, the historical data (e.g., inputs and/or other data) may be fed into the simulation server, where the simulation server includes one or more service instances having the behavior modification policy, to simulate an output and/or behavior of the one or more services running on the simulation server with the behavior modification policy in effect during the particular time period. The simulated output and/or behavior may then be compared to the output and/or behavior provided in the historical data to check for accuracy and/or parity between the sets of data. In some embodiments, the comparing of the simulated output and/or behavior to the historical data may be an embodiment of block 310, discussed above. Thus, in some embodiments, the determination of whether a particular metric is satisfied (block 310) may be carried out by the simulation server (application server 412), the production server (application server 410), the behavior modification system 202, or a combination thereof.

The process of feeding historical data into the simulation server to test a behavior modification policy on the simulation server, prior to rolling out the behavior modification policy to the production server, may be referred to "replaying" a service with the historical data. For example, consider that during a prior time period one or more services were running (e.g., on a production server) using a particular processing logic, configuration files, libraries, policies, or other infrastructure features. In various embodiments, the simulation server may implement a new processing logic, configuration file, library, policy, or other infrastructure feature. The simulation server can then be said to "replay" the service using both the historical data and the new processing logic, configuration file, library, policy, or other infrastructure feature to effectively observe what impact, if any, the new processing logic, configuration file, library, policy, or other infrastructure feature would have had on the historical data (e.g., such as changes to an output and/or behavior).

After the service having the modified service behavior is determined to satisfy the desired metric (block 310), the method 300 then proceeds to block 312 where the registered policy is transmitted to a second satellite agent located at a second server. For example, with reference to FIG. 4, and in an embodiment of block 312, the registered policy is transmitted to a satellite agent 414 located at the application server 410, as indicated by arrow 411. In some embodiments, the satellite agent 414 and the application server 410 may be embodiments of the satellite agent 214 and the application server 210, discussed above. As noted above, and in some embodiments, the application server 410 includes a production server. It is further noted that after the determination that the service having the modified service behavior satisfies the desired metric (block 310), the registered policy may be transmitted to any number of other satellite agents located at any number of other application servers (production servers) having the same or different environments, platforms, technology stacks, or other components, in addition to the application server 410. Like the application server 412, the application server 410 may include a plurality of service instances corresponding to a risk service, a user service, a refund service, an admin service, a transaction service, and a compliance service. The risk service, the user service, and the refund service running on the application server 410 may include the vulnerable firewall (e.g., version 1.0), while the admin service, the transaction service, and the compliance service running on the application server 410 include the enhanced firewall (e.g., version 2.0).

After the satellite agent 414 receives the registered policy, and in further embodiment of block 312, the satellite agent 414 may enforce the policy on the plurality of service instances running on the application server 410. In the present example, the modification instruction defined by the registered policy may include replacing the vulnerable firewall (e.g., version 1.0) with the enhanced firewall (e.g., version 2.0). Further, the satellite agent 414 may monitor the service instances and determine which of the plurality of service instances include the vulnerable firewall (e.g., version 1.0) and which include the enhanced firewall (e.g., version 2.0). As a result, the policy received by the satellite agent 414 may apply the policy (the modification instruction) to the services instances having the vulnerability (the risk service, the user service, and the refund service), as indicated by arrows 413, thereby updating their respective firewalls to the enhanced firewall (e.g., version 2.0). In some embodiments, the risk service, the user service, and the refund service may need to be restarted after the satellite agent applies the modification instruction, for example, to complete the updates to their respective firewalls.

In some embodiments, data may also be received by the behavior modification system 202 from the satellite agent 414, as indicated by arrow 417. In some embodiments, the data received includes log files generated by each of the service instances running on the application server 410. The log files may contain error information, warning information, debug messages, and/or other information related to the service instances running on the application server 410. Further, and in some embodiments, the data received includes information corresponding to the service instances having the modified service behavior (e.g., the updated firewall, in the present example) running on the application server 410.

Figure 5:
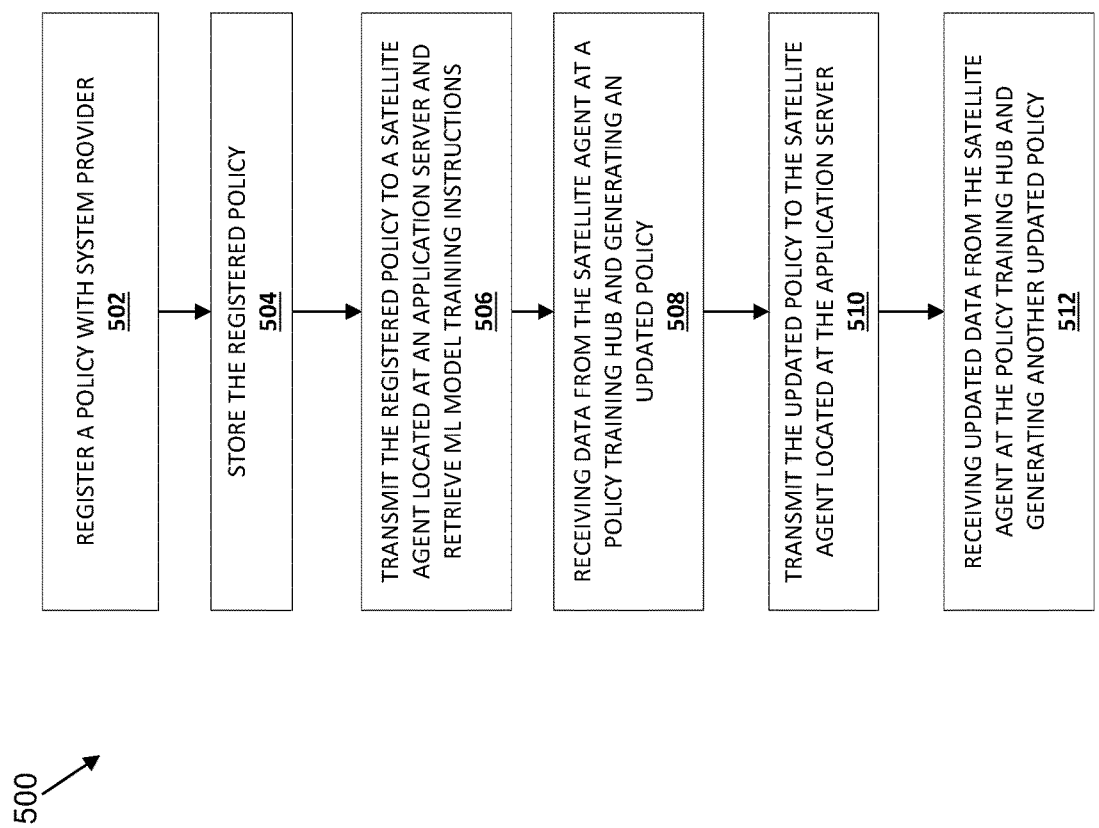
FIG. 5 is a flow chart illustrating an embodiment of a method for implementing both policy modification and training.

Another exemplary method for regulating service behavior is shown in FIG. 5, which illustrates an embodiment of a method 500 for implementing both policy modification and training. Thus, in various examples, the method 500 illustrates service instances having their behavior governed by AI/ML-based policies. It will be understood that additional steps may be performed before, during, and/or after the steps described below with reference to the method 500. In addition, while the steps of the method 500 are shown as occurring serially (e.g., one after another), two or more of the steps of the method 500 may occur in parallel. Further, the steps of the method 500 need not be performed in the order shown and/or one or more of the steps of the method 500 need not be performed. For purposes of illustration, the method 500 is shown and described with reference to FIG. 6, which includes an exemplary view of a system 600 for regulating service behavior. The system 600 includes various features that are substantially the same as features described above with reference to FIG. 2. Thus, one or more aspects discussed above with reference to the system 200 may also apply to the system 600. Additionally, at least some of the operations described with reference to the method 500 may be performed by a system provider (e.g., operating a system provider device).

Figure 6:
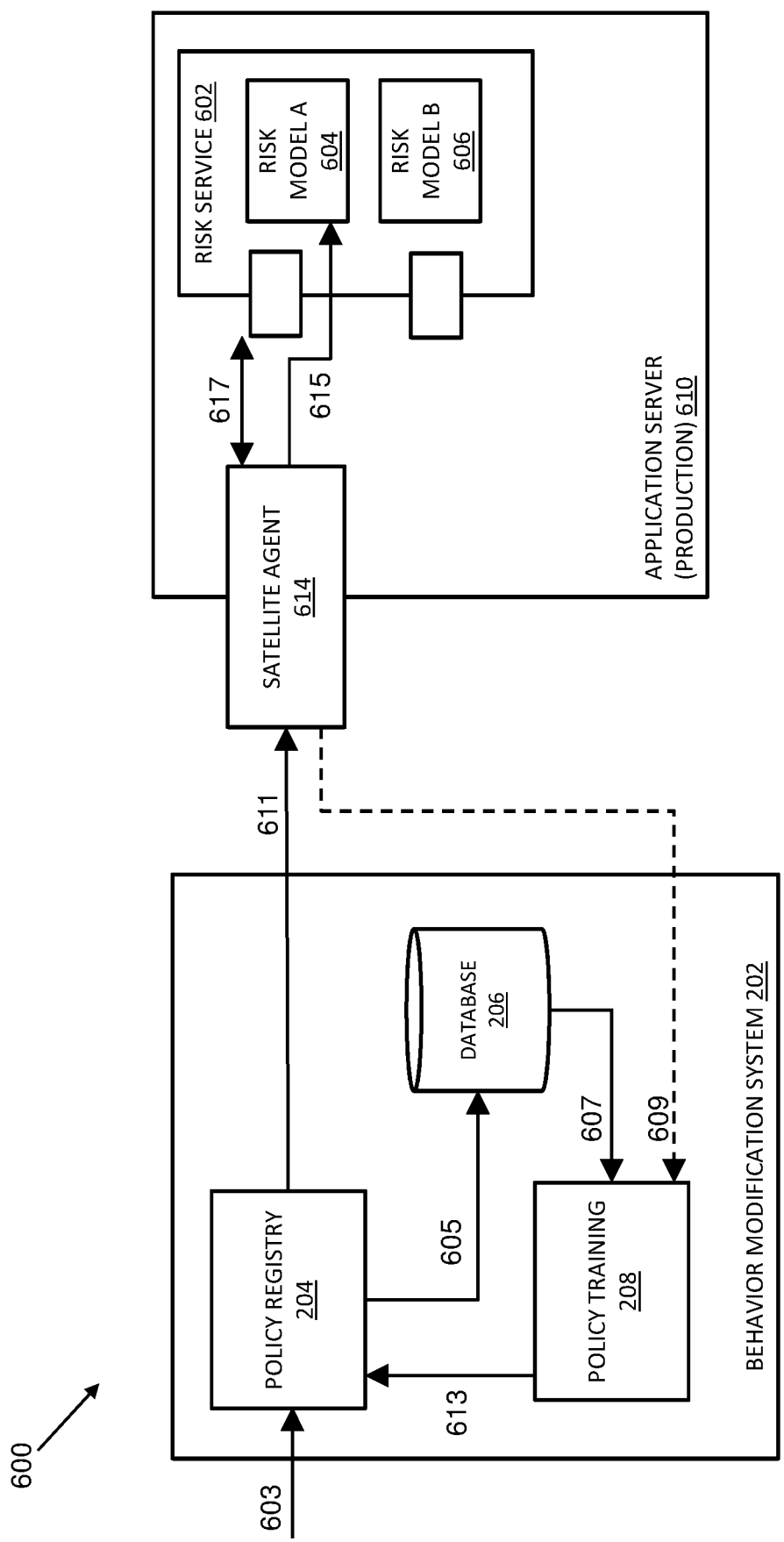
FIG. 6 is a schematic view illustrating another embodiment of the system for regulating service behavior, as shown in FIG. 2.

The method 500 begins at block 502 where a policy is registered with a system provider. As noted above, the system provider may operate a system provider device 112, which includes a behavior modification system (e.g., such as the behavior modification system 202). With reference to FIG. 6, and in an embodiment of block 502, a policy is registered with the policy registry 204 of the behavior modification system 202, as indicated by arrow 603. The policy registered at block 502 may be configured to implement a desired behavior modification for a service instance running on an application server 610. For purposes of the example of FIG. 6, consider that the policy registered with the policy registry 204 has been constructed using a set of rules, where the set of rules defines a category, which services are to be governed, a modification instruction, a targeted model, and a rollout instruction. As merely one example, and as part of determining a risk of transaction, the category may include risk mitigation, the services to be governed may include a risk service 602 running on the application server 610, the modification instruction may define upper and lower risk threshold values and provide instructions for editing a model parameter (e.g., such as a 'country origin weight' value) for a model running on the risk service 602, the targeted model in this example may include a 'risk by country' model, and the rollout instruction may specify that the policy for behavior modification is to be sent to a production application server (e.g., such as the application server 610). While some examples of rules used to construct the policy for behavior modification have been provided, these examples are not meant to be limiting, and those skilled in the art in possession of the present disclosure will recognize other rules that may be used to construct the policy, while remaining within the scope of the present disclosure. For example, in some embodiments, the set of rules may define other categories, other services to be governed, other modification instructions, other targeted models, or other rollout instructions. After registering the policy with the policy registry 204, the method 500 proceeds to block 504 where the registered policy is stored. For example, with reference to FIG. 6, and in an embodiment of block 504, the policy registered with the policy registry 204 is stored in the database 206, as indicated by arrow 605.

The method 500 then proceeds to block 506 where the registered policy is transmitted to a satellite agent located at an application server and where model training instructions (e.g., AI/ML model training instructions) are retrieved. For example, with reference to FIG. 6, and in an embodiment of block 506, the registered policy is transmitted to a satellite agent 614 located at an application server 610, as indicated by arrow 611. In some embodiments, the satellite agent 614 and the application server 610 may be embodiments of the satellite agent 214 and the application server 210, discussed above. In some embodiments, the application server 610 includes a production server. In the present example, the application server 610 includes the risk service 602, where the risk service includes a first risk model 604 and a second risk model 606. Generally, models included within a service instance (e.g., such as the first risk model 604 and the second risk model 606) provide a layer of rules for running the risk service 602, while the policy training hub 208 provides the AI/ML models that govern the models within the service instance, thereby effectively providing an additional layer of rules. This provides more flexibility in terms of patching services. In some embodiments, the first risk model 604 includes the 'risk by country' model, and the second risk model 606 includes a 'risk by occupation' model. It will be understood that these risk models are merely exemplary, and the risk service 602 may include any number of other risk models. Further, it will be understood that the application server 610 may equally include any number of other services, each of which may include their own embedded models (e.g., a user service may include a user service model, a refund service may include a refund service model, a transaction service may include a transaction service model, a compliance service may include a compliance service model, etc.).

After the satellite agent 614 receives the registered policy, and in further embodiment of block 506, the satellite agent 614 may enforce the policy on the risk service 602 running on the application server 610. In addition, the satellite agent 614 may monitor the risk service 602 and retrieve data or statistics to be used for updating an AI/ML based-policy (e.g., such as a country origin weight, current risk level, or other data or statistics), as indicated by arrow 617. The data or statistics retrieved from the risk service 602 may include log files, as described above, and which may contain error information, warning information, debug messages, and/or other information related to the risk service 602 running on the application server 610.

In another embodiment of block 506, model training instructions (e.g., AI/ML model training instructions) are retrieved by the policy training hub 208 from the database 206, as indicated by arrow 607. In some embodiments, the model training instructions may include instructions defined by the registered policy, or by other instructions provided by a service application owner/developer, which were previously stored in the database 206. In some cases, retrieval of the model training instructions by the policy training hub 208 may occur before, after, or simultaneously with, transmission of the registered policy to the satellite agent 614 located at the application server 610. In at least some examples, the policy training hub 208 may also retrieve a previously stored policy from the database 206 on which to perform a policy update based on the data or statistics retrieved from the risk service 602.

The method 500 then proceeds to block 508 where data is received from the satellite agent at a policy training hub and an updated policy is generated. For example, with reference to FIG. 6, and in an embodiment of block 508, data is received by the policy training hub 208, of behavior modification system 202, from the satellite agent 614, as indicated by arrow 609. In some embodiments, the data received includes statistics or other data, which may be provided in the form of log files generated by the risk service 602 running on the application server 610. In various embodiments, the data received includes information corresponding to a service instance (e.g., the risk service 602) having a modified service behavior (e.g., based on the registered policy applied to the risk service 602) running on the application server 610. In some embodiments, the policy training hub 208 may then use the data received from the satellite agent 614 (from the risk service 602) to train/update the AI/ML models and update the behavior modification policy accordingly. Thus, using the data from the satellite agent 614, the policy training hub 208 generates an updated policy.

In some embodiments, the updated policy may provide a set of rules for updating the previously applied policy in order to provide an updated behavior modification for a service (e.g., the risk service 602) running on the application server 610. For example, the updated policy may include a set of rules that define a category, which services are to be governed, a modification instruction, a targeted model, and a rollout instruction. For purposes of the present example, the category may include model adjustment, the services to be governed may include the risk service 602, the modification instruction may provide instructions for updating a model parameter (e.g., such as a 'country origin weight' value) for a model running on the risk service 602, the targeted model in this example may include a 'risk by country' model, and the rollout instruction may specify that the policy for updating the behavior modification is to be sent to a production application server (e.g., such as the application server 610). After updating the policy (e.g., at the policy training hub 208), the updated policy may be registered with the policy registry 204, as indicated by arrow 613, and the updated policy (registered with the policy registry 204) may be stored in the database 206, as indicated by arrow 605.

In at least some embodiments, the data received from the satellite agent 614 by the behavior modification system 202, and which corresponds to the service instance (e.g., the risk service 602) having a modified service behavior (e.g., based on the registered policy applied to the risk service 602) running on the application server 610, may also be analyzed to determine/verify whether a particular metric is satisfied, as discussed above. In some embodiments, for example if the particular metric is satisfied, the policy training hub 208 may not need to generate an updated policy, and instead the previously applied policy may remain in effect for the service instance (e.g., the risk service 602).

After generating the updated policy (block 508), the method 500 then proceeds to block 510 where the updated policy is transmitted to the satellite agent located at an application server. For example, with reference to FIG. 6, and in an embodiment of block 510, the updated policy is transmitted to the satellite agent 614 located at the application server 610, as indicated by arrow 611. As noted above, the application server 610 includes the risk service 602, where the risk service includes a first risk model 604 and a second risk model 606.

After the satellite agent 614 receives the updated policy, and in further embodiment of block 510, the satellite agent 614 may enforce the updated policy on the risk service 602 running on the application server 610. In the present example, the set of rules for the updated policy provide instructions for updating a model parameter (e.g., the 'country origin weight' value) for the first risk model 604 (the 'risk by country' model) running on the risk service 602. As a result, the updated policy received by the satellite agent 614 may apply the updated policy (including the modification instruction) to the first risk model 604, as indicated by arrow 615, thereby updating the first risk model 604 (e.g., by updating the 'country origin weight' value). In addition to updating the first risk model 604, the satellite agent 614 continues to monitor the risk service 602 and retrieve updated data or statistics to be used for further updating the AI/ML based-policy, if needed. As previously noted, the data or statistics retrieved from the risk service 602 may include log files, for example, which may contain error information, warning information, debug messages, and/or other information related to the risk service 602 running on the application server 610.

The method 500 then proceeds to block 512 where updated data is received from the satellite agent at the policy training hub and another updated policy is generated, if needed. For example, with reference to FIG. 6, after updating the first risk model 604 (at block 510) and in an embodiment of block 512, updated data is received by the policy training hub 208, of behavior modification system 202, from the satellite agent 614, as indicated by arrow 609. In some embodiments, the updated data received includes updated statistics or other data, which may be provided in the form of log files generated by the risk service 602 running on the application server 610. In various embodiments, the updated data received includes information corresponding to the risk service 602 having a modified service behavior (e.g., the updated first risk model 604, based on the updated policy applied to the risk service 602) running on the application server 610. In some embodiments, the policy training hub 208 may then use the updated data received from the satellite agent 614 (from the risk service 602) to further train/update the AI/ML models and further update the behavior modification policy accordingly. Thus, using the updated data from the satellite agent 614, the policy training hub 208 may generate another updated policy. In addition, and after further updating the policy (e.g., at the policy training hub 208), the further updated policy may be registered with the policy registry 204 and stored in the database 206.

In various embodiments, the sequence of steps described above with reference to the method 500 (e.g., applying a behavior modification policy to a service instance running on an application server, updating the policy, and applying the updated policy to the service instance) may be repeated for any number of iterations until a desired or expected output and/or behavior of a service (e.g., such as the risk service 602) running on the application server is achieved. Additionally, in some embodiments, the steps described above with reference to the methods 300, 500 may be combined, as needed. For example, one or more steps of the method 300 may be inserted before, during, and/or after any of the steps of the method 500. Likewise, one or more steps of the method 500 may be inserted before, during, and/or after any of the steps of the method 300. It will also be understood that the examples given above, for example with reference to the methods 300 and 500, are merely exemplary and are not meant be limiting in any way. Moreover, those of skill in the art in possession of this disclosure will recognize that various additional embodiments may be implemented in accordance with the methods described herein, while remaining within the scope of the present disclosure.

Figure 7:
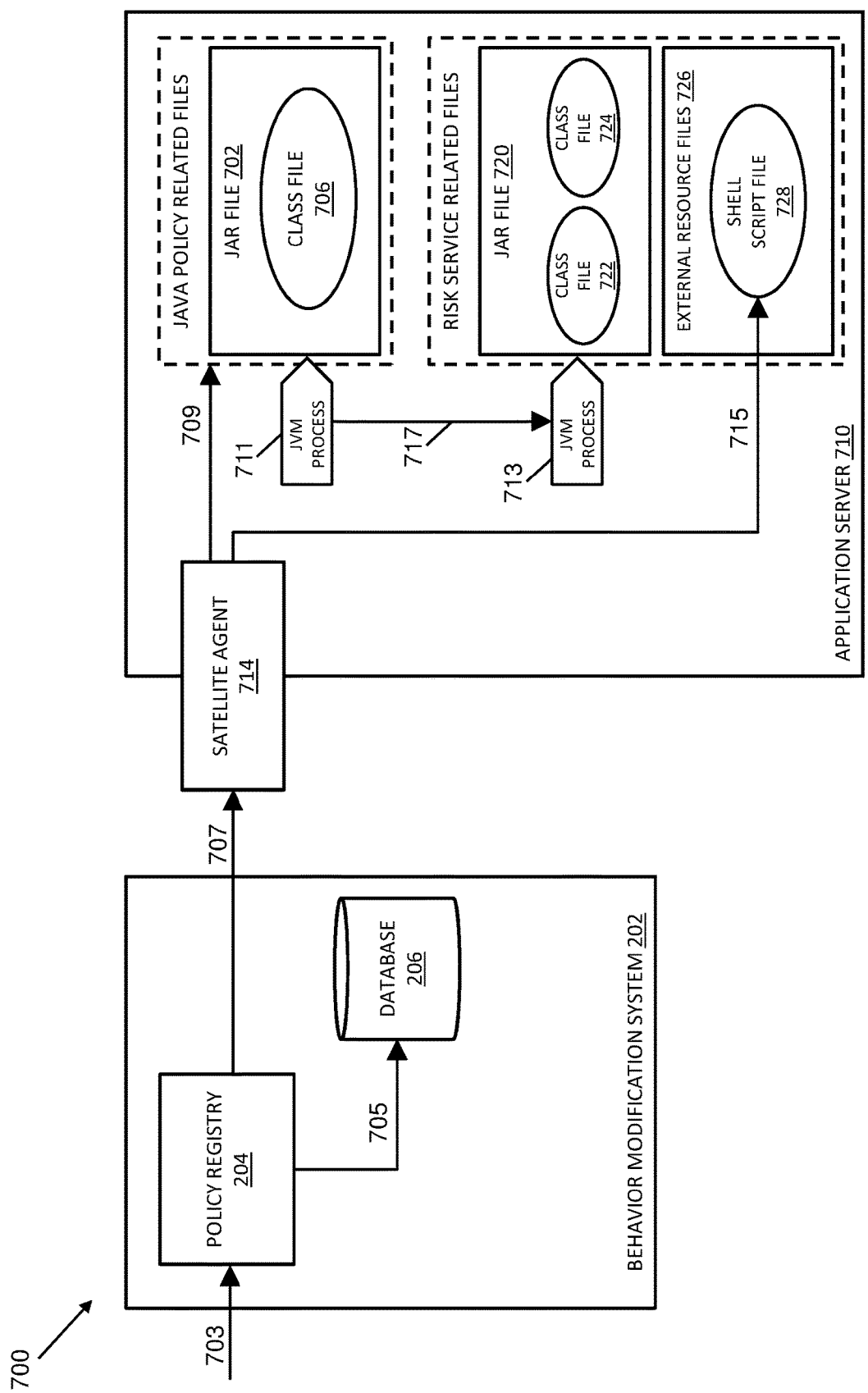
FIG. 7 is a schematic view illustrating an embodiment of a system for regulating service behavior using various mechanism.

Referring now to FIG. 7, illustrated therein is an exemplary system 700 for regulating service behavior (e.g., implementing a policy modification) using various mechanisms. In particular, the system 700 provides additional technical details regarding the underlying functionality of the various systems and methods described herein. The system 700 includes various features that are similar to features described above with reference to FIGS. 2, 4, and 6. Thus, one or more aspects discussed above with reference to the systems 200, 400, and 600 may also apply to the system 700. Further, the system 700 may be used to implement one or more aspects of the methods 300 and 500, discussed above.

As shown, the system 700 includes the behavior modification system 202 and an application server 710 including a satellite agent 714. The behavior modification system 202 includes the policy registry 204 and the database 206, as previously discussed. In some embodiments, the satellite agent 714 and the application server 710 may be embodiments of the satellite agents and application servers discussed above. In various embodiments, the application server 710 may include a production server, a QA server, a simulation server, or other type of server.

In a first example, the system 700 may implement a policy modification, and thus modify a service behavior, using a Java agent. For instance, a Java-based policy may be registered with the policy registry 204 of the behavior modification system 202, as indicated by arrow 703. The Java-based policy may be configured to implement a desired behavior modification for a service instance running on the application server 710. Like the examples discussed above, the Java-based policy may be constructed using a set of rules. In an embodiment, the set of rules may define a category, which services are to be governed, a modification instruction, and a rollout instruction. As merely one example, the category may include risk mitigation, the services to be governed may include a risk service running on the application server 710, the modification instruction may include a custom modifier defined by one or more Java classes packaged within a Java Archive (JAR) file (e.g., such as DataLoadModifier.jar), and the rollout instruction may specify that the Java-based policy is to be sent to a production application server (e.g., the application server 710). In various examples, the JAR file includes the Java agent, where the Java agent is configured for runtime interference. Generally, if a service instance is not yet running, the Java agent may be bundled with or attached to the service instance prior to running the services instance. Alternatively, if the service instance is already running, the Java agent may be instructed to interfere with an already running Java process. After registering the Java-based policy with the policy registry 204, the registered Java-based policy is stored in the database 206, as indicated by arrow 705.

The registered Java-based policy is then transmitted to the satellite agent 714 located at the application server 710, as indicated by arrow 707. After the satellite agent 714 receives the Java-based registered policy, the satellite agent 714 may enforce the policy on one or more service instances (such as a risk service, in the present example) running on the application server 710. It is noted that in order to execute, and thus apply, the Java-based registered policy to the one or more service instances, the application server 710 may include a Java Runtime Environment (JRE). The JRE includes a Java Virtual Machine (JVM) and a set of Java runtime libraries. The JVM may generally include a class loader, an execution engine, and a runtime data area (memory area). By way of example, the class loader is responsible for loading, linking, and initialization of class files. Class files include compiled Java source code, also referred to as bytecode. The execution engine is responsible for reading and executing the bytecode contained within the class files. In various embodiments, the execution engine may execute bytecode for class files that have been loaded into the runtime data area.

In the present example, the exemplary modification instruction defined by the Java agent is contained within a JAR file 702 (e.g., such as DataLoadModifier.jar). JAR files include compressed files containing one or more Java class files, associated metadata, and other resources. In the present example, the JAR file 702 may include a class file 706 (e.g., such as DataAnalysisAgent.class). In some embodiments, the class file 706 includes the bytecode configured for runtime interference of the risk service running on the application server 710. After the satellite agent 714 receives the Java-based registered policy, including the JAR file 702, the satellite agent 714 may place the JAR file 702 (which includes the class file 706) for execution by the JVM, as indicated by arrow 709.

With respect to the risk service running on the application server 710, consider that the risk service includes various risk service related files such as a JAR file 720 and external resource files 726. In some embodiments, the JAR file 720 includes a class file 722 and a class file 724. In the present example, the class file 722 may include a DataAnalysis.class file, and the class file 724 may include a DataLoader.class file. The class files 722, 724 may provide some or all of the functionality of the risk service running on the application server 710. By way of example, the JVM may execute the JAR file 720 (e.g., including the class files 722, 724) and thus bring up or initiate the JVM process 713. Further, the JVM may execute the JAR file 702 (e.g., including the class file 706), which was previously placed for execution, and thus bring up or initiate a JVM process 711. In some embodiments, and because of how the class file 706 is written and the way in which the JAR file 702 is brought up, the JVM process 711 may interfere with the JVM process 713, as indicated by arrow 717. Generally, this may be referred to as dynamic loading of a Java agent (e.g., as opposed to static loading), where a Java agent is loaded into an already running process (e.g., such as the already running risk service running on the application server 710). In some cases, the interference of the JVM process 713 by the JVM process 711 may modify the class file 722 (DataAnalysis.class) during runtime (e.g., during a runtime class loading phase), thus changing its behavior. In some examples, modification of the class file 722 can be used to change the running service (e.g., the risk service) in a variety of ways. For instance, it may change a database location, a load timeout, a concurrency mechanism, or other feature of the service. In various embodiments, modification of the class file 722 thereby effectively enforces the Java-based registered policy received by the satellite agent 714.

In a second example, the system 700 may implement the policy modification, and thus modify the service behavior, using a shell script. Shell scripts may be written using a variety of scripting languages such as Bash, Sh, Python, PowerShell, Perl, PHP, Tcl, Python, Ruby, Javascript, among others. In some examples, shell scripts may be used for file manipulation and program execution, among other uses. In the present example, a shell script-based policy may be registered with the policy registry 204 of the behavior modification system 202, as indicated by arrow 703. The shell script-based policy may be configured to implement a desired behavior modification for a service instance running on the application server 710. The shell script-based policy may be constructed using a set of rules. In an embodiment, the set of rules may define a category, which services are to be governed, a modification instruction, and a rollout instruction. As merely one example, the category may include risk mitigation, the services to be governed may include a risk service running on the application server 710, the modification instruction may include a custom modifier defined by a shell script (e.g., network_transfer.sh) and configured to execute a file replacement, and the rollout instruction may specify that the shell script-based policy is to be sent to a production application server (e.g., the application server 710). After registering the shell script-based policy with the policy registry 204, the registered shell script-based policy is stored in the database 206, as indicated by arrow 705.

The registered shell script-based policy is then transmitted to the satellite agent 714 located at the application server 710, as indicated by arrow 707. After the satellite agent 714 receives the shell script-based registered policy, the satellite agent 714 may enforce the policy on one or more service instances (such as a risk service, in the present example) running on the application server 710. In the present example, the exemplary modification instruction defined by the shell script (e.g., network_transfer.sh) is contained within a shell script file 728. After the satellite agent 714 receives the shell script-based registered policy, including the shell script file 728, the satellite agent 714 may replace the shell script file 728 within the external resource files 726, as indicated by arrow 715. It is noted that the file replacement described in the present example may include either a direct file replacement or a replacement using layers of Docker. In either case, and as a result of replacing the shell script file 728, the shell script-based registered policy received by the satellite agent 714 is effectively enforced. While some specific examples of mechanisms that may be used for regulating service behavior (e.g., implementing a policy modification) have been provided with reference to the discussion of FIG. 7, these examples are not meant to be limiting, and those skilled in the art in possession of the present disclosure will recognize other mechanisms that may be used, while remaining within the scope of the present disclosure. For example, in addition to using a Java agent or performing file replacement using a shell script, other mechanisms may include a Docker/Java agent combination, file replacement using a Docker volume mechanism, or other appropriate mechanism. In general, the mechanism, or combination of mechanisms, used for regulating service behavior may depend on the nature of the service to be regulated, the deployment platform for the service, which service behavior is to be modified, or other such features.

Figure 8:
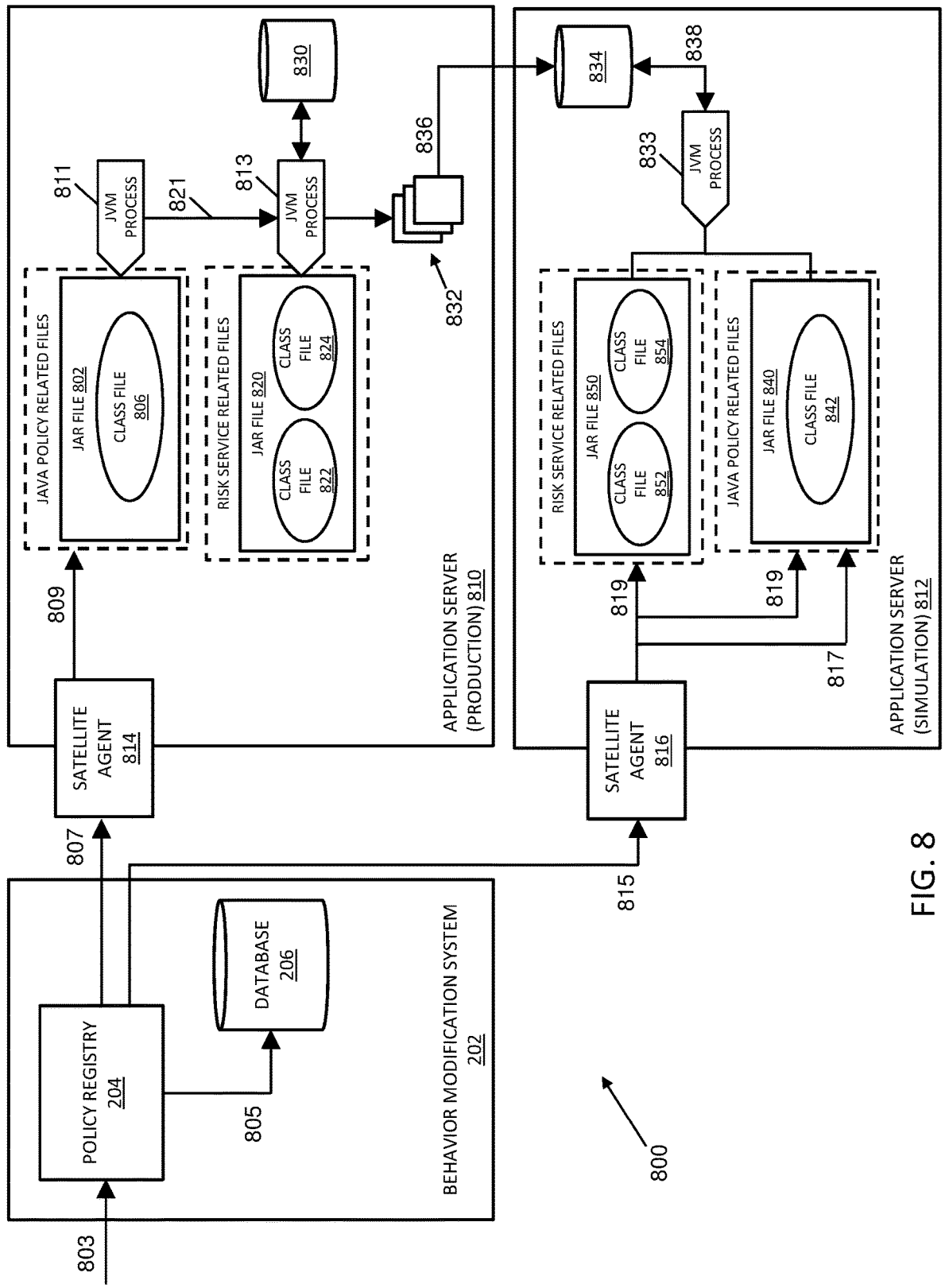
FIG. 8 is a schematic view illustrating an embodiment of a system for regulating service behavior to facilitate a simulation process.

With reference to FIG. 8, illustrated therein is an exemplary system 800 for regulating service behavior to facilitate a simulation process. The system 800 provides additional technical details regarding the underlying functionality of the various systems and methods described herein. The system 800 includes various features that are similar to features described above with reference to FIGS. 2, 4, 6, and 7. Thus, one or more aspects discussed above with reference to the systems 200, 400, 600, and 700 may also apply to the system 800. Further, the system 800 may be used to implement one or more aspects of the methods 300 and 500, discussed above.

The system 800 includes the behavior modification system 202, an application server 810 including a satellite agent 814, and an application server 812 including a satellite agent 816. The behavior modification system 202 includes the policy registry 204 and the database 206, as previously discussed. In some embodiments, the satellite agents 814, 816 and the application servers 810, 812 may be embodiments of the satellite agents and application servers discussed above. In the present example, consider that the application server 810 includes a production server, and the application server 812 includes a simulation server.

To facilitate the simulation process, for example as discussed above with reference to FIG. 4, the system 800 may initially implement a policy modification using a Java agent, where the policy modification provides a mechanism for capturing historical data for services running on a production server (e.g., by exporting the historical data to one or more external locations). However, as noted above, policy modifications may also be accomplished using other mechanisms. For purposes of this example, consider that a Java-based policy is registered with the policy registry 204 of the behavior modification system 202, as indicated by arrow 803. The Java-based policy may be configured to implement a desired behavior modification for a service instance running on the application server 810. Like the examples discussed above, the Java-based policy is constructed using a set of rules. The set of rules may define a category, which services are to be governed, a modification instruction, and a rollout instruction. In order to facilitate simulation, and in some embodiments, the category may include simulation enabling, the services to be governed may include a risk service running on the application server 810, the modification instruction may include a custom modifier defined by one or more Java classes (including a Java agent) packaged within a JAR file (e.g., such as SimulationCaptureReplay.jar) and configured for runtime interference, and the rollout instruction may specify that the Java-based policy is to be sent to a production application server (e.g., the application server 810). After registering the Java-based policy with the policy registry 204, the registered Java-based policy is stored in the database 206, as indicated by arrow 805.

The registered Java-based policy is then transmitted to the satellite agent 814 located at the application server 810, as indicated by arrow 807. After the satellite agent 814 receives the Java-based registered policy, the satellite agent 814 may enforce the policy on one or more service instances (e.g., such as a risk service) running on the application server 810 for which a corresponding simulation process is desired to be performed (e.g., on a simulation server). In various embodiments, the application server 810 and the application server 812 may include a JRE having a JVM and a set of Java runtime libraries in order to execute Java-based policies, as discussed above with reference to the example of FIG. 7.

In some embodiments, the exemplary modification instruction defined by the one or more Java classes (including the Java agent) is included within the JAR file 802 (e.g., SimulationCaptureReplay.jar). In the present example, the JAR file 802 may include a class file 806 (DataCaptureAgent.class). In some embodiments, the class file 806 includes the bytecode configured for runtime interference of the risk service running on the application server 810. After the satellite agent 814 receives the Java-based registered policy, including the JAR file 802, the satellite agent 814 may place the JAR file 802 (which includes the class file 806) for execution by the JVM, as indicated by arrow 809.

With respect to the risk service running on the application server 810, consider that the risk service includes various risk service related files such as a JAR file 820, where the JAR file 820 includes a class file 822 and a class file 824. In the present example, the class file 822 may include a DataAnalysis.class file, and the class file 824 may include a DataLoader.class file. The class files 822, 824 may provide some or all of the functionality of the risk service running on the application server 810. By way of example, the JVM may execute the JAR file 820 (e.g., including the class files 822, 824) and thus bring up or initiate the JVM process 813. Further, the JVM may execute the JAR 802 (e.g., including the class file 806), which was previously placed for execution, and thus bring up or initiate a JVM process 811. In some embodiments, and because of how the class file 806 is written and the way in which the JAR file 802 is brought up, the JVM process 811 may interfere with the JVM process 813, as indicated by arrow 821. Thus, a Java agent is dynamically loaded into an already running process (e.g., such as the already running risk service running on the application server 810). In some cases, the interference of the JVM process 813 by the JVM process 811 may modify each of the class files 822 and 824 during runtime to enable capture of an output of the executing class files (e.g., such as the class files 822, 824). In addition to the output of the executing class files, the captured data may include data loaded from a production database 830, information regarding execution time, or other information. In various embodiments, modification of the class files 822, 824 thereby effectively enforces the Java-based registered policy received by the satellite agent 814. It is also noted that the capture of the output of the executing classes (or export of such data) that is enabled by the disclosed embodiments is in contrast to at least some existing solutions, where data related to services running on an application server is provided through an HTTP request-response process.

In some examples, the JVM process 813 (or the risk service in general) may further store to, or read data from, the production database 830. The data stored to, or read from, the production database 830 may include data (e.g., such as production output data) associated with the one or more service instances (e.g., such as a risk service) running on the application server 810. Moreover, and as a result of the JVM process 813, log files 832 may be created. The log files 832 may include captured operations data, results data, or other data associated with the one or more service instances (e.g., such as a risk service) running on the application server 810. In various embodiments, the data stored in the production database 830 and/or the log files 832 may be embodiments of the historical data, described above. After creation of the log files 832, and in some embodiments, simulation data stored in a simulation database 834 may be retrieved (as indicated by arrow 836) for comparison with the historical data. Alternatively, and in some examples, the historical data may be fed into the simulation server from the production server (e.g., by saving the historical data to the simulation database 834 of the application server 812) for use in simulating an output and/or behavior of a service running on the simulation server for a time period corresponding to that of the historical data, as described herein. The simulated output and/or behavior may then be compared to the output and/or behavior provided in the historical data to check for accuracy and/or parity between the sets of data. Thus, the Java-based registered policy received by the satellite agent 814 effectively provides a mechanism for capturing historical data (e.g., output data of the executing class files) for services running on the application server 810, which can then be used to check for accuracy/parity with simulated output data generated by a simulation server (e.g., such as the application server 812) which may simulate the effect of changes to processing logic, configuration files, libraries, policies, or other infrastructure features.

After providing the mechanism for capturing historical data for services running on a production server (e.g., such as the application server 810), as described above, policy modifications (including any particular modified rule specifications) for which simulation is desired (e.g., prior to rolling out the policy modification to another environment, such as to a production server) can be can be tested using a simulation server (e.g., such as the application server 812). For example, consider that a behavior modification policy, for which simulation is desired and which may include a Java-based policy or other type of policy, is registered with the policy registry 204 of the behavior modification system 202, as indicated by arrow 803. For purposes of this example, assume that the behavior modification policy includes a Java-based policy. The Java-based policy may be configured to implement a desired behavior modification for a service instance running on the simulation server (e.g., the application server 812). In various embodiments, the Java-based policy is constructed using a set of rules which may define a category, which services are to be governed, a modification instruction, a rollout instruction, and/or other features, as described above. After registering the Java-based policy with the policy registry 204, the registered Java-based policy is stored in the database 206, as indicated by arrow 805.

The registered Java-based policy, for which simulation is desired, is then transmitted to the satellite agent 816 located at the simulation server (e.g., the application server 812), as indicated by arrow 815. After the satellite agent 816 receives the Java-based policy, the satellite agent 816 may enforce the policy on one or more service instances on which a simulation process is to be performed (such as a risk service, in the present example) running on the application server 812.

In the present example, the Java-based policy may include a JAR file 840. The JAR file 840 may include a class file 842 (DataReplayAgent.class). In some embodiments, the class file 842 includes the bytecode configured to provide for "replaying" a service (e.g., such as the risk service), as described above, with historical data as part of the simulation process. After the satellite agent 816 receives the Java-based policy, including the JAR file 840, the satellite agent 816 may place the JAR file 840 (which includes the class file 842) for execution by the JVM, as indicated by arrow 817.

As described above with reference to the production server (application server 810), the simulation server (application server 812) also includes an instance of the risk service having various risk service related files such as a JAR file 850, where the JAR file 850 includes a class file 852 and a class file 854. In the present example, the class file 852 may include a DataAnalysis.class file, and the class file 854 may include a DataLoader.class file. The class files 852, 854 may provide some or all of the functionality of the risk service running on the application server 812. In addition, and in some embodiments, it is noted that the risk service related files including the JAR file 850, the class file 852, and the class file 854 on the simulation server may be substantially the same as the JAR file 820, the class file 822, and the class file 824, respectively, on the production server. After the JAR file 840, which includes the DataReplayAgent class file ("agent class file"), is placed for execution, the risk service is run on the simulation server (the application server 812) with the agent class file, as indicated by arrows 819 and the JVM process 833. It is noted that in contrast to a production environment, in a simulation environment, agents (e.g., such as the agent class file) may be attached to services at bootup time, not at runtime.

In various embodiments, the JVM process 833 may be configured to execute one or more of the class files 842, 852, and 854. Stated another way, the execution engine of the JVM may be used to execute the bytecode contained within one or more of the class files 842, 852, and 854. Thus, the risk service is run on the simulation server (the application server 810) with a behavior modification policy that is desired to be subsequently rolled out in a production environment. In some examples, the JVM process 833 (or the risk service in general) may also store to, or read data from, the simulation database 834, as indicated by arrow 838. It is noted that in some embodiments, the DataReplayAgent class file may instruct the risk service to change its behavior regarding from which database data is retrieved. For example, the DataReplayAgent class file may instruct the risk service to retrieve data from the simulation database 834, rather than the production database 830. The data stored to, or read from, the simulation database 834 may include simulation data associated with the one or more service instances (e.g., such as a risk service) running on the application server 812. In some embodiments, the simulation data stored in the simulation database 834 may then be compared with the historical data provided by the production server (application server 810). Alternatively, the historical data may be provided to the simulation server (e.g., via the simulation database 834), and the JVM process 833 (or the risk service in general) may read the historical data from the simulation database 834 and replay the risk service (on the simulation server) using the historical data. Stated another way, the simulation server may use the historical data to simulate an output and/or behavior of a service (e.g., the risk service, in this example) running on the simulation server for a time period corresponding to that of the historical data. The simulated output and/or behavior may then be compared to the output and/or behavior provided in the historical data to check for accuracy and/or parity between the sets of data.

Generally, the examples of FIGS. 7 and 8 thus provide at least some underlying technical details for how the various systems and methods disclosed herein may be used to provide a process by which substantially any desired policy modification may be simulated prior to rolling out the policy modification to a different environment (e.g., a production environment). In particular, by using a simulation server to simulate applying a particular policy (e.g., behavior modification policy) to a service instance prior to applying the policy to a service instance on the production server, the desired policy can be tested in a safe environment and avoid potential damage that could be caused if the behavior modification policy were applied straightaway to a live, production environment. While some specific examples of mechanisms that may be used for facilitating a simulation process have been provided with reference to the discussion of FIG. 8, these examples are not meant to be limiting, and those skilled in the art in possession of the present disclosure will recognize other mechanisms that may be used, while remaining within the scope of the present disclosure.

Figure 9:
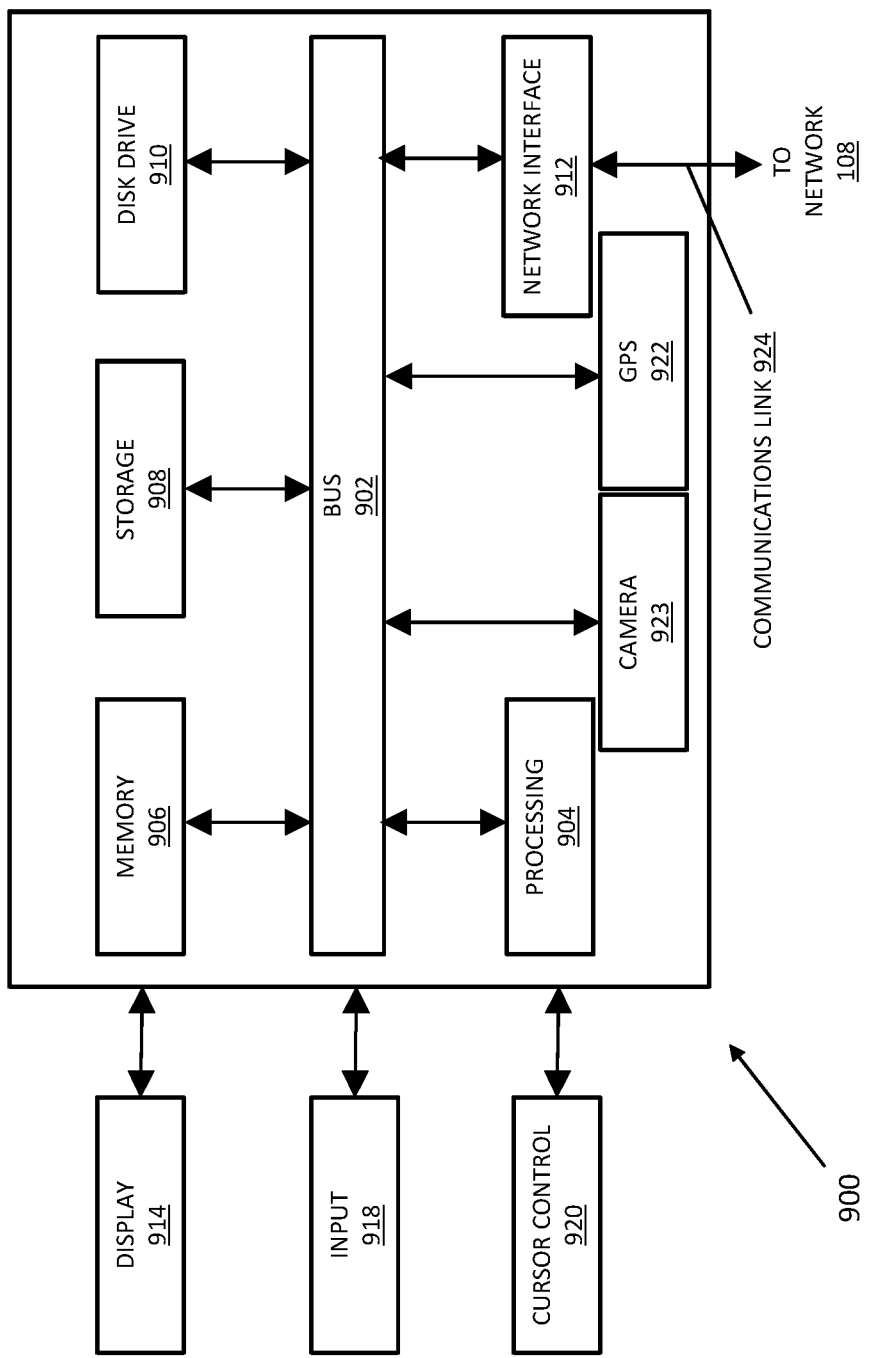
FIG. 9 is a schematic view illustrating an embodiment of a computer system.

Referring now to FIG. 9, an embodiment of a computer system 900 suitable for implementing, for example, the client devices 104, the application infrastructure 110, the system provider device 112, the behavior modification system 202, the application servers 130, 210, 212, 410, 412, 610, 710, 810, 812 and/or the satellite agents 132, 214, 216, 414, 416, 614, 714, 814, 816 is illustrated. It should be appreciated that other devices utilized by clients, service application owners, developers, and/or system providers in the system discussed above may be implemented as the computer system 900 in a manner as follows.

In accordance with various embodiments of the present disclosure, computer system 900, such as a computer and/or a network server, includes a bus 902 or other communication mechanism for communicating information, which interconnects subsystems and components, such as a processing component 904 (e.g., processor, micro-controller, digital signal processor (DSP), etc.), a system memory component 906 (e.g., RAM), a static storage component 908 (e.g., ROM), a disk drive component 910 (e.g., magnetic or optical), a network interface component 912 (e.g., modem or Ethernet card), a display component 914 (e.g., CRT or LCD), an input component 918 (e.g., keyboard, keypad, or virtual keyboard), a cursor control component 920 (e.g., mouse, pointer, or trackball), a location determination component 922 (e.g., a Global Positioning System (GPS) device as illustrated, a cell tower triangulation device, and/or a variety of other location determination devices known in the art), and/or a camera component 923. In one implementation, the disk drive component 910 may comprise a database having one or more disk drive components.

In accordance with embodiments of the present disclosure, the computer system 900 performs specific operations by the processor 904 executing one or more sequences of instructions contained in the memory component 906, such as described herein with respect to the client devices 104, the application infrastructure 110, the system provider device 112, the behavior modification system 202, the application servers 130, 210, 212, 410, 412, 610, 710, 810, 812 and/or the satellite agents 132, 214, 216, 414, 416, 614, 714, 814, 816. Such instructions may be read into the system memory component 906 from another computer readable medium, such as the static storage component 908 or the disk drive component 910. In other embodiments, hard-wired circuitry may be used in place of or in combination with software instructions to implement the present disclosure.

Logic may be encoded in a computer readable medium, which may refer to any medium that participates in providing instructions to the processor 904 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 910, volatile media includes dynamic memory, such as the system memory component 906, and transmission media includes coaxial cables, copper wire, and fiber optics, including wires that comprise the bus 902. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 900. In various other embodiments of the present disclosure, a plurality of the computer systems 900 coupled by a communication link 924 to the network 108 (e.g., such as a LAN, WLAN, PTSN, and/or various other wired or wireless networks, including telecommunications, mobile, and cellular phone networks) may perform instruction sequences to practice the present disclosure in coordination with one another.

The computer system 900 may transmit and receive messages, data, information and instructions, including one or more programs (i.e., application code) through the communication link 924 and the network interface component 912. The network interface component 912 may include an antenna, either separate or integrated, to enable transmission and reception via the communication link 924. Received program code may be executed by processor 904 as received and/or stored in disk drive component 910 or some other non-volatile storage component for execution.

Thus, systems and methods have been described that provide for regulating and/or modifying service behaviors on-the-fly across substantially any type of environment or platform. In particular, and as noted above, the disclosed embodiments provide for real time and non-intrusive modification of a behavior of a service that is running on any type of application server including any type of technology framework or stack. As a result, the systems and methods disclosed herein provide a full-scale, comprehensive service behavior regulating system that works across any type of technology stack or environment. In some embodiments, the disclosed systems include a central hub (e.g., a service provider) that governs policy registration and construction, as well as satellite agents, which are located at the various application servers and which enforce the policies for services running on their respective application servers. In at least some embodiments, a behavior modification policy may initially be tested using a simulation application server prior to transmitting the behavior modification policy to a production application server. With reference to the discussion provided herein, it will be understood that the examples given are merely exemplary and are not meant be limiting in any way. Moreover, those of skill in the art in possession of this disclosure will recognize that various additional embodiments may be implemented in accordance with the methods and systems described herein, while remaining within the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
a non-transitory memory; and
one or more hardware processors coupled to the non-transitory memory and configured to read instructions from the non-transitory memory to cause the system to perform operations comprising:
registering a policy with a system provider, the policy automatically generated using a machine learning (ML) model and policy information or policy criteria supplied to a policy training module of the system provider from a system provider database, the policy defining a modified service behavior for a service running on a plurality of remote servers, wherein at least two remote servers of the plurality of remote servers include application servers implemented using different technology stacks, and wherein the different technology stacks have at least one of a different operating system, a different web server, a different database, a different programming language, or a different web development framework;

transmitting the registered policy to a first satellite agent located at a first remote server of the plurality of remote servers;

after transmitting the registered policy to the first satellite agent, receiving data from the first satellite agent corresponding to the service having the modified service behavior running on the first remote server;

verifying, by the system provider, that the service having the modified service behavior running on the first remote server satisfies a metric; and in response to the verifying, transmitting the registered policy to a second satellite agent located at a second remote server of the plurality of remote servers.

2. The system of claim 1, wherein the operations further comprise:

after registering the policy, storing the policy accessible by the system provider.

3. The system of claim 1, wherein the first remote server includes a simulation server, and wherein the second remote server includes a production server.

4. The system of claim 1, wherein the operations further comprise:

in response to the verifying, transmitting the registered policy to a third satellite agent located on a third remote server of the plurality of remote servers;

wherein the second remote server includes a first application server including a first stack, and wherein the third remote server includes a second application server including a second stack different from the first stack.

5. The system of claim 4, wherein the first and second stacks have at least one of the different operating system, the different web server, the different database, the different programming language, or the different web development framework.

6. The system of claim 1, wherein the modified service behavior defined by the registered policy provides a patch for the service running on the plurality of remote servers without modification of source code associated with the service running of the plurality of remote servers.

7. The system of claim 3, wherein the verifying includes comparing the data corresponding to the service having the modified service behavior running on the simulation server to historical data, the historical data corresponding to the service running on the production server prior to the transmitting the registered policy to the second satellite agent.

8. The system of claim 7, wherein the metric includes a parity metric between the data corresponding to the service having the modified service behavior running on the simulation server and the historical data.

9. The system of claim 1, wherein the operations further comprise:

receiving, at the policy training module of the system provider, the data from the first satellite agent corresponding to the service having the modified service behavior running on the first remote server;

generating, by the policy training module, an updated policy using the data from the first satellite agent, the updated policy registered with the system provider; and after generating the updated policy, transmitting the updated policy to at least one of the first satellite agent or the second satellite agent, wherein the updated policy defines an updated modified service behavior for the service running on the plurality of remote servers.

10. The system of claim 9, wherein the generating the updated policy includes using the data from the first satellite agent to update the ML model, and wherein the updated ML model generates the updated policy.

11. A method for modifying a service behavior, comprising:

transmitting, by a service provider system, a registered policy to a first satellite agent located at a first remote server, wherein the registered policy is automatically generated using a machine learning (ML) model and policy information supplied to a policy training module of the service provider system from a service provider database, wherein the policy defines a modified service behavior for a service running on the first remote server, wherein the first remote server is implemented using a different technology stack than a second remote server, and wherein the different technology stack has at least one of a different operating system, a different web server, a different database, a different programming language, or a different web development framework;

after transmitting the registered policy to the first satellite agent, receiving, at a policy training module of the service provider system, data from the first satellite agent corresponding to the service having the modified service behavior running on the first remote server;

generating, by the policy training module, an updated policy using the data from the first satellite agent, the updated policy registered with the service provider system; and after generating the updated policy, transmitting, by the service provider system, the updated policy to the first satellite agent, wherein the updated policy defines an updated modified service behavior for the service running on the first remote server.

12. The method of claim 11, wherein the service includes a model to determine a risk of transaction, and wherein the modified service behavior defined by the registered policy includes a model parameter, the model parameter used by the model to determine the risk of transaction.

13. The method of claim 11, further comprising:

verifying, by the service provider system, that the service having the modified service behavior running on the first remote server satisfies a metric; and in response to the verifying, transmitting, by the service provider system, the registered policy to a second satellite agent located at the second remote server, wherein the registered policy defines the modified service behavior for the service running on the second remote server.

14. The method of claim 13, wherein the first remote server includes a simulation server, and wherein the second remote server includes a production server.

15. The method of claim 13, wherein the different technology stack includes the different operating system.

16. The method of claim 14, wherein the verifying includes comparing, by the service provider system, the data corresponding to the service having the modified service behavior running on the simulation server to historical data, the historical data corresponding to the service running on the production server prior to the transmitting the registered policy to the second satellite agent, and wherein the metric includes a parity metric between the data corresponding to the service having the modified service behavior running on the simulation server and the historical data.

17. A non-transitory machine-readable medium having stored thereon machine-readable instructions executable to cause a machine to perform operations comprising:
- transmitting, by a system provider, a policy to a first satellite agent located at a simulation server, the policy automatically generated using a machine learning (ML) model and policy information supplied to a policy training module of the system provider from a system provider database, and the policy defining a modified service behavior for a service running on the simulation server;
- after transmitting the policy to the first satellite agent, receiving data from the first satellite agent corresponding to the service having the modified service behavior running on the simulation server;
- verifying, by the system provider, that the service having the modified service behavior running on the simulation server satisfies a metric; and
- in response to the verifying, transmitting the policy to a second satellite agent located at a first production server, wherein the first production server includes a first application server having a first stack different than a second stack of a second application server of a second production server, and wherein the first and second stacks have at least one of a different operating system, a different web server, a different database, a different programming language, or a different web development framework;
- wherein the verifying includes comparing the data corresponding to the service having the modified service behavior running on the simulation server to historical data, the historical data corresponding to the service running on the first production server prior to the transmitting the policy to the second satellite agent.

18. The non-transitory machine-readable medium of claim 17, wherein the metric includes a parity metric between the data corresponding to the service having the modified service behavior running on the simulation server and the historical data.

19. The non-transitory machine-readable medium of claim 17, wherein the operations further comprise:
- in response to the verifying, transmitting the policy to a third satellite agent located on the second production server different than the first production server.

20. The non-transitory machine-readable medium of claim 19, wherein the first and second stacks have the different operating system.

* * * * *